US008881096B2

(12) United States Patent
Nakabayashi et al.

(10) Patent No.: US 8,881,096 B2

(45) Date of Patent: Nov. 4, 2014

(54) COMPUTER PRODUCT, IP MODEL GENERATING APPARATUS, AND IP MODEL GENERATING METHOD

(75) Inventors: Seiji Nakabayashi, Shinjuku (JP); Masato Tatsuoka, Shinjuku (JP)

(73) Assignee: Fujitsu Semiconductor Limited, Yokohama (JP)

(*) Notice: Subject to any disclaimer, the term of this patent is extended or adjusted under 35 U.S.C. 154(b) by 743 days.

(21) Appl. No.: 12/626,989

(22) Filed: Nov. 30, 2009

(65) Prior Publication Data

US 2010/0218166 A1 Aug. 26, 2010

(30) Foreign Application Priority Data

Feb. 20, 2009 (JP) ................................ 2009-038525

(51) Int. Cl.
*G06F 9/44* (2006.01)
*G06F 17/50* (2006.01)

(52) U.S. Cl.
CPC .. *G06F 8/35* (2013.10); *G06F 8/36* (2013.01); *G06F 2217/66* (2013.01); *G06F 2217/84* (2013.01); *G06F 17/5054* (2013.01)
USPC ............................ 717/104; 717/106; 716/103

(58) Field of Classification Search
USPC .................................................. 717/104, 106
See application file for complete search history.

(56) References Cited

U.S. PATENT DOCUMENTS

| | | | | |
|---|---|---|---|---|
| 6,970,875 | B1 * | 11/2005 | Dey | 717/163 |
| 6,996,788 | B2 * | 2/2006 | Akiba et al. | 716/103 |
| 2003/0229482 | A1 * | 12/2003 | Cook et al. | 703/14 |
| 2009/0319983 | A1 | 12/2009 | Tatsuoka et al. | |

FOREIGN PATENT DOCUMENTS

| | | | |
|---|---|---|---|
| JP | 2001-202397 | A | 7/2001 |
| JP | 2006-163523 | A | 6/2006 |
| JP | 2008-052356 | A | 3/2008 |
| JP | 2010-3195 | A | 1/2010 |

OTHER PUBLICATIONS

Japanese Office Action mailed Oct. 16, 2012 for corresponding Japanese Application No. 2009-038525, with English-language Translation.

Japanese Office Action mailed Jul. 9, 2013 for corresponding Japanese Application No. 2009-038525, with Partial English-language Translation.

* cited by examiner

*Primary Examiner* — Li B Zhen
*Assistant Examiner* — Duy Khuong Nguyen
(74) *Attorney, Agent, or Firm* — Fujitsu Patent Center

(57) ABSTRACT

A computer-readable recording medium stores therein an IP model that combines source code of IPs that include an interface representing input/output of data; a register storing the data; a behavior executing processing based on the data; and a state performing wait processing according to time information from the interface and a connection code indicative of a connecting relation between the IPs.

9 Claims, 33 Drawing Sheets

FIG.9

UnTimed 900
901
902

```
void
MODEL::b_transport(generic_payload& trans) {
  length  = trans.get_data_length();
  address = (unsigned int)trans.get_address();
  data    = trans.get_data_ptr();
  command = trans.get_command();
  sc_time t = 0;
  if((command == TLM_WRITE_COMMAND) & (address == DEF_MODEL_REG)) {
    t = (sc_time)behavior_MODEL(reg, t): // API CALL with no delay
    trans.set_response_status(tlm::TLM_OK_RESPONSE);
  }
    :
  return;
}
```

FIG.10

Timed

1000 {1001, 1002}

```
sync_enum_type
MODEL::nb_transport(generic_payload& trans, phase_type& phase, sc_time& t) {
 length  = trans.get_data_length();
 address = (unsigned int)trans.get_address();
 data    = trans.get_data_ptr();
 command = trans.get_command();

 if((command == TLM_WRITE_COMMAND) & (address == DEF_MODEL_REG)) {
  t = (sc_time)behavior_MODEL(reg, t): // API CALL with delay
  trans.set_response_status(tlm::TLM_OK_RESPONSE);
 }
 phase = tlm::END_REQ;
 return tlm::TLM_COMPLETED;
}
```

```
TYPE_DELAY
MODEL::behavior_MODEL(TYPE_ARGS args, TYPE_DELAY delay) {
 TYPE_DELAY t = 100;
 // PROCESS
   :
 delay += t;
 t = 100;
 return t;
}
```

```
TYPE_DELAY
MODEL::behavior_MODEL(TYPE_ARGS args, TYPE_DELAY delay) {    IMPLEMENT STATE
    TYPE_DELAY t = 100;
    // PROCESS
    ..
    delay += t;
    set_delay(delay); // set delay for State
    state_event.notify(); // EVENT NOTIFY with delay
    t = 100;
    return t;
}
```

UnTimed

1400: 1401, 1402

```
MODEL::MODEL(const sc_module_name &name) :
  sc_module(name)
 ,target_socket("target_socket") {
  target_socket(*this); // Interface Binding          ← 1401

  SC_THREAD(main); // State Thread                     ← 1402
    sentive << state_event;
}

void
MODEL::main() {
  for(;;) {
    wait(); // WAIT EVENT
    switch(state) {
    case BEGIN_OF_PROCESS:
      // some process
        :
      state = PROCESS_A; // set next state
        :
    case PROCESS_A:
      // some process
        :
      state = END_OF_PROCESS; // set next state
    case END_OF_PROCESS:
      // some process
        :
      state = BEGIN_OF_PROCESS; // set next state
}
```

FIG.15

Timed

1500: 1501, 1402

```
MODEL::MODEL(const sc_module_name &name) :
  sc_module(name)
 ,target_socket("target_socket") {
  target_socket(*this); // Interface Binding        ← 1501
  SC_THREAD(main); // State Thread                  ← 1402
    sentive << state_event;
}

void
MODEL::main() {
  for(;;) {
    wait(); // WAIT EVENT
    switch(state) {
    case BEGIN_OF_PROCESS:
      // some process
        :
      state = PROCESS_A; // set next state
      wait(delay); // WAIT DELAY if timed model     ← 1502
    case PROCESS_A:
      // some process
        :
      state = END_OF_PROCESS; // set next state
    case END_OF_PROCESS:
      // some process
        :
      state = BEGIN_OF_PROCESS; // set next state
}
```

```
TYPE_DELAY
MODEL::behavior_MODEL(TYPE_ARGS args, TYPE_DELAY delay) {
    TYPE_DELAY t = 100;
    // PROCESS
    ..
    delay += t;
    reg_val = reg.get_val(address, size); // get register value
    reg.set_val(address, size, value); // set register value
    t = 100;
    return t;
}
```

ACCESS 1100
1601
1600

TO BE REFERENCED

```
TYPE_DATA
reg::get_val(TYPE_ADDRESS address, TYPE_SIZE size) {
  switch(address) {
  case REG_ADDRESS: for(i=0;i<size;i++) data[i] = mem[address];
    :
  default : break;
  }
  return data;
}
```

TO BE UPDATED

```
void
reg::set_val (TYPE_ADDRESS address, TYPE_SIZE size, TYPE_DATA
data) {
  switch(address) {
  case REG_ADDRESS: for(i=0;i<size;i++) mem[address+i] = data[i];
    :
  default break;
  }
  return;
}
```

FIG.19

NOT IMPLEMENT STATE

1900: 1700, 1800

1700:

```
TYPE_DATA
reg::get_val(TYPE_ADDRESS address, TYPE_SIZE size) {
  switch(address) {
  case REG_ADDRESS:
    for(i=0;i<size;i++) data[i] = mem[address];
      :
    break;
    :
  default : break;
  }
  return data;
}
```

1800:

```
void
reg::set_val(TYPE_ADDRESS address, TYPE_SIZE,
TYPE_DATA data) {
  switch(address) {
  case REG_ADDRESS:
    for(i=0;i<size;i++) mem[address+i] = data[i];
    break;
    :
  default break;
  }
  return;
}
```

IMPLEMENT STATE

1700

```
TYPE_DATA
reg::get_val(TYPE_ADDRESS address, TYPE_SIZE size) {
 switch(address) {
 case REG_ADDRESS:
  for(i=0;i<size;i++) data[i] = mem[address];
  state_event.notify(); // EVENT NOTIFY
  break;
  :
 default : break;
 }
 return data;
}
```

2001

1800

```
void
reg::set_val(TYPE_ADDRESS address, TYPE_SIZE,
TYPE_DATA data) {
 switch(address) {
 case REG_ADDRESS:
  for(i=0;i<size;i++) mem[address+i] = data[i];
  break;
  :
 default break;
 }
 return;
}
```

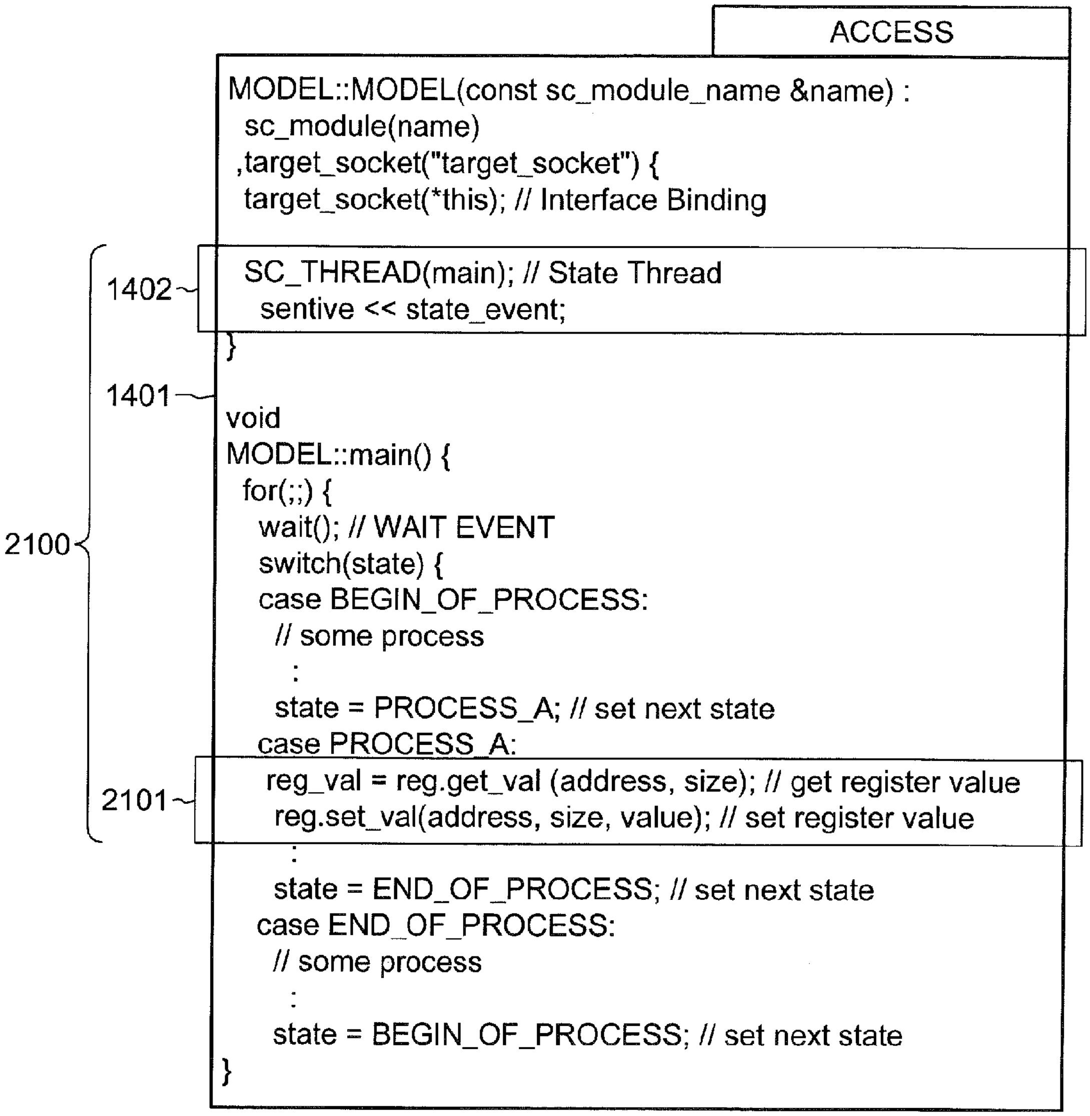

FIG.21

```
                                                          ACCESS
         MODEL::MODEL(const sc_module_name &name) :
          sc_module(name)
          ,target_socket("target_socket") {
          target_socket(*this); // Interface Binding

  1402─┤  SC_THREAD(main); // State Thread
            sentive << state_event;
         }
  1401─
         void
         MODEL::main() {
          for(;;) {
           wait(); // WAIT EVENT
           switch(state) {
           case BEGIN_OF_PROCESS:
            // some process
               :
            state = PROCESS_A; // set next state
           case PROCESS_A:
  2101─┤   reg_val = reg.get_val (address, size); // get register value
            reg.set_val(address, size, value); // set register value
               :
            state = END_OF_PROCESS; // set next state
           case END_OF_PROCESS:
            // some process
               :
            state = BEGIN_OF_PROCESS; // set next state
         }
```

(2100 brace encompasses 1402, 1401, and 2101)

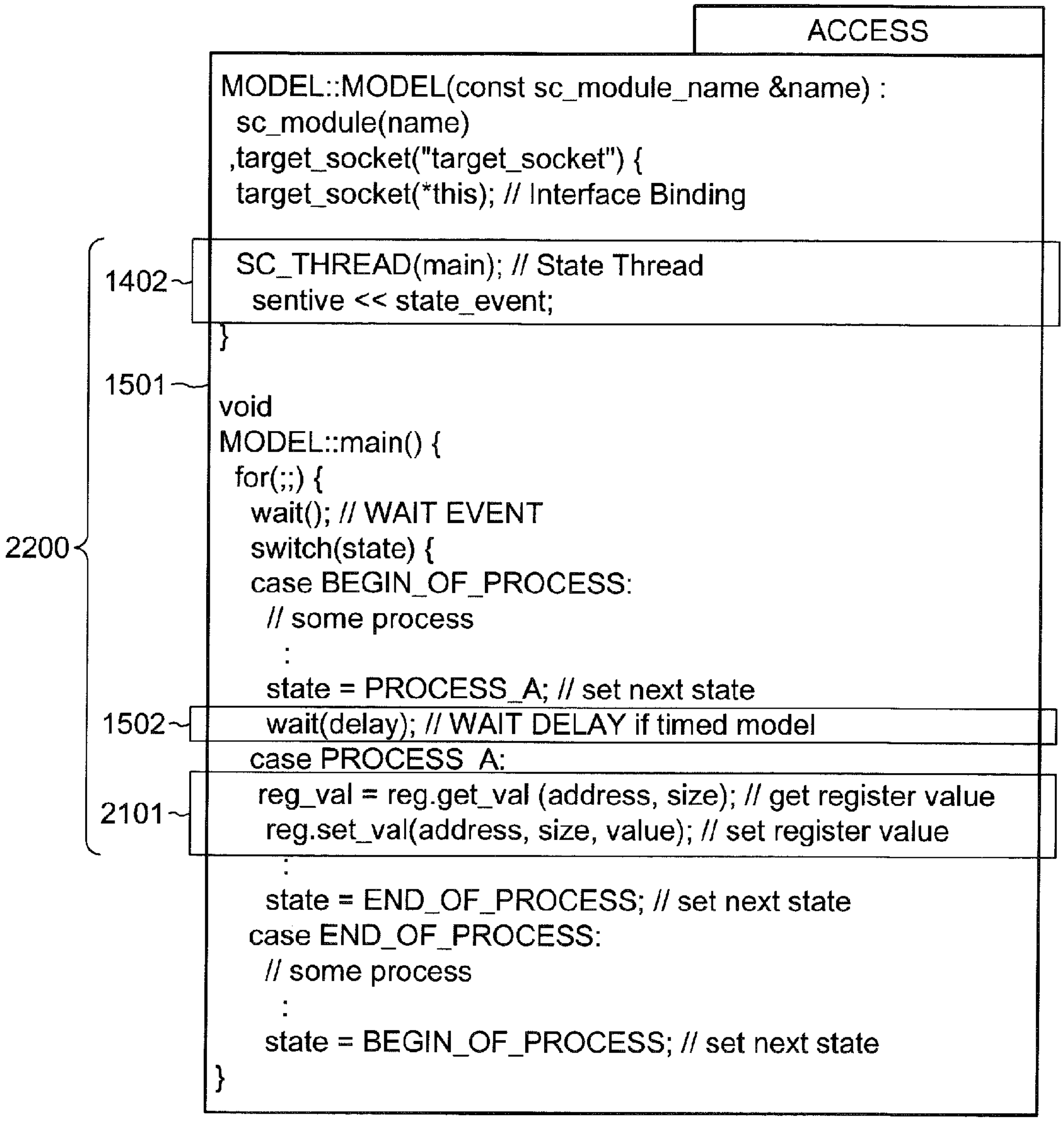

FIG.22

```
                                                    ACCESS
    MODEL::MODEL(const sc_module_name &name) :
    sc_module(name)
    ,target_socket("target_socket") {
    target_socket(*this); // Interface Binding

1402─  SC_THREAD(main); // State Thread
        sentive << state_event;
    }
1501─
    void
    MODEL::main() {
      for(;;) {
        wait(); // WAIT EVENT
        switch(state) {
        case BEGIN_OF_PROCESS:
          // some process
            :
          state = PROCESS_A; // set next state
1502─     wait(delay); // WAIT DELAY if timed model
        case PROCESS_A:
2101─     reg_val = reg.get_val (address, size); // get register value
          reg.set_val(address, size, value); // set register value
            :
          state = END_OF_PROCESS; // set next state
        case END_OF_PROCESS:
          // some process
            :
          state = BEGIN_OF_PROCESS; // set next state
    }
```

(2200 brackets lines 1402, 1501, 1502, 2101)

FIG.23

INITIATE BEHAVIOR

```
MODEL::MODEL(const sc_module_name &name) :
  sc_module(name)
 ,target_socket("target_socket") {
  target_socket(*this); // Interface Binding
  SC_THREAD(main); // State Thread            [1402]
    sentive << state_event;
}
                                              [1401]
void
MODEL::main() {
  for(;;) {
    wait(); // WAIT EVENT                     [2300]
    switch(state) {
    case BEGIN_OF_PROCESS:
      // some process
        :
      state = PROCESS_A; // set next state
    case PROCESS_A:
      t = (sc_time)behavior_MODEL(reg, delay): // API CALL with delay   [2301]
        :
      state = END_OF_PROCESS; // set next state
    case END_OF_PROCESS:
      // some process
        :
      state = BEGIN_OF_PROCESS; // set next state
}
```

FIG.24

INITIATE BEHAVIOR

```
MODEL::MODEL(const sc_module_name &name) :
  sc_module(name)
 ,target_socket("target_socket") {
  target_socket(*this); // Interface Binding

1402~  SC_THREAD(main); // State Thread
         sentive << state_event;
}
1501~
void
MODEL::main() {
  for(;;) {
    wait(); // WAIT EVENT
2400  switch(state) {
    case BEGIN_OF_PROCESS:
      // some process
        :
      state = PROCESS_A; // set next state
1502~  wait(delay); // WAIT DELAY if timed model
    case PROCESS_A:
2301~  t = (sc_time)behavior_MODEL(reg, delay): // API CALL with delay
        :
      state = END_OF_PROCESS; // set next state
    case END_OF_PROCESS:
      // some process
        :
      state = BEGIN_OF_PROCESS; // set next state
}
```

NOT IMPLEMENT INTERFACE

```
TYPE_DELAY
MODEL::behavior_MODEL(TYPE_ARGS args, TYPE_DELAY delay) {
  TYPE_DELAY t = 100;
  // PROCESS
    :
  delay += t;
    :
    :
  return t;
}
```

```
TYPE_DELAY
MODEL::behavior_MODEL(TYPE_ARGS args, TYPE_DELAY delay) {     — IMPLEMENT INTERFACE
  TYPE_DELAY t = 100;
  // PROCESS
  ..
  delay += t;
  delay += trans_read(address, size, data, len, time);
  delay += trans_write(address, size, data, len, time);
  return t;
}
```

FIG.27

UnTimed

```
TYPE_DELAY
MODEL::trans_write(TYPE_ADDRESS address, TYPE_SIZE size, TYPE_DATA& data,
TYPE_LENGTH len, TYPE_TIME time) {
  trans.set_data_length(length);
  trans.set_address(address);
  trans.set_data_ptr(data);
  trans.set_command(WRITE);
  t = &time;
  b_transport(trans);
  return t;
}
TYPE_DELAY
MODEL::trans_read(TYPE_ADDRESS address, TYPE_SIZE size, TYPE_DATA& data,
TYPE_LENGTH len, TYPE_TIME time) {
  trans.set_data_length(length);
  trans.set_address(address);
  trans.set_data_ptr(data);
  trans.set_command(READ);
  t = &time;
  b_transport(trans);
  return t;
}
```

2700
2701
2702

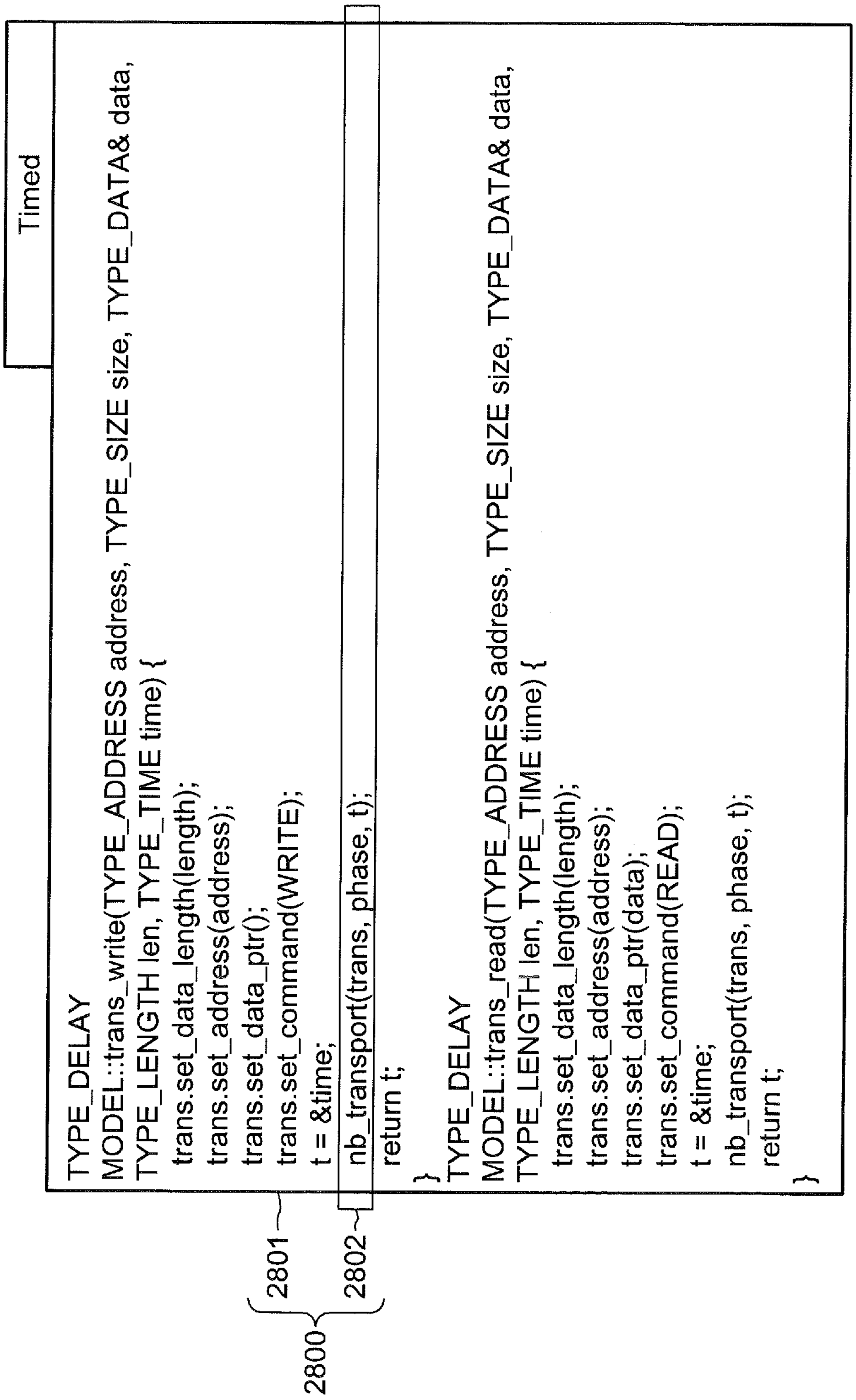

FIG.28

```
                                                              Timed
TYPE_DELAY
MODEL::trans_write(TYPE_ADDRESS address, TYPE_SIZE size, TYPE_DATA& data,
TYPE_LENGTH len, TYPE_TIME time) {
  trans.set_data_length(length);
  trans.set_address(address);
  trans.set_data_ptr();
  trans.set_command(WRITE);
  t = &time;
  nb_transport(trans, phase, t);
  return t;
}
TYPE_DELAY
MODEL::trans_read(TYPE_ADDRESS address, TYPE_SIZE size, TYPE_DATA& data,
TYPE_LENGTH len, TYPE_TIME time) {
  trans.set_data_length(length);
  trans.set_address(address);
  trans.set_data_ptr(data);
  trans.set_command(READ);
  t = &time;
  nb_transport(trans, phase, t);
  return t;
}
```

| INPUT INTERFACE | | | | |
|---|---|---|---|---|
| ID | IP ATTRIBUTE | MODEL ATTRIBUTE | CONNECTION CODE ID | PARENT ELEMENT |
| in1 | SIGNAL INPUT | UT | ··· | ··· |
| in2 | SIGNAL INPUT | LT | ··· | ··· |
| in3 | REGISTER ACCESS | UT | ··· | ··· |
| in4 | REGISTER ACCESS | LT | ··· | ··· |
| in5 | DATA TRANSFER | UT | ··· | ··· |
| in6 | DATA TRANSFER | LT | ··· | ··· |
| ··· | ··· | ··· | ··· | ··· |

| OUTPUT INTERFACE | | | | |
|---|---|---|---|---|
| ID | IP ATTRIBUTE | MODEL ATTRIBUTE | CONNECTION CODE ID | PARENT ELEMENT |
| out1 | SIGNAL INPUT | UT | ··· | ··· |
| out2 | SIGNAL INPUT | LT | ··· | ··· |
| out3 | REGISTER ACCESS | UT | ··· | ··· |
| out4 | REGISTER ACCESS | LT | ··· | ··· |
| out5 | DATA TRANSFER | UT | ··· | ··· |
| out6 | DATA TRANSFER | LT | ··· | ··· |
| ··· | ··· | ··· | ··· | ··· |

| BEHAVIOR | | | | |
|---|---|---|---|---|
| ID | IP ATTRIBUTE | MODEL ATTRIBUTE | CONNECTION CODE ID | PARENT ELEMENT |
| be1 | PROCESS ONLY | - | ... | ... |
| be2 | STATE DRIVE | - | ... | ... |
| be3 | REGISTER ACCESS | - | ... | ... |
| be4 | REGISTER REFERENCE | - | ... | ... |
| be5 | REGISTER UPDATE | - | ... | ... |
| be6 | OUTPUT INTERFACE NON-DRIVE | - | ... | ... |
| be7 | OUTPUT INTERFACE DRIVE | - | ... | ... |
| ... | ... | ... | ... | ... |

| STATE | | | | |
|---|---|---|---|---|
| ID | IP ATTRIBUTE | MODEL ATTRIBUTE | CONNECTION CODE ID | PARENT ELEMENT |
| st1 | DRIVEN BY BEHAVIOR | UT | ... | ... |
| st2 | DRIVEN BY BEHAVIOR | LT | ... | ... |
| st3 | REGISTER ACCESS | UT | ... | ... |
| st4 | REGISTER ACCESS | LT | ... | ... |
| st5 | DRIVE BEHAVIOR | UT | ... | ... |
| st6 | DRIVE BEHAVIOR | LT | ... | ... |
| ... | ... | ... | ... | ... |

| REGISTER | | | | |
|---|---|---|---|---|
| ID | IP ATTRIBUTE | MODEL ATTRIBUTE | CONNECTION CODE ID | PARENT ELEMENT |
| re1 | REGISTER ACCESS | - | ... | ... |
| re2 | REGISTER REFERENCE | - | ... | ... |
| re3 | REGISTER UPDATE | - | ... | ... |
| re4 | STATE NON-DRIVE | - | ... | ... |
| re5 | STATE DRIVE | - | ... | ... |
| ... | ... | ... | ... | ... |

| CONNECTION CODE | | |
|---|---|---|
| ID | CONNECTION ATTRIBUTE | MODEL ATTRIBUTE |
| in1 | API CALL | UT |
| in2 | API CALL | LT |
| in3 | STATE EVENT NOTIFICATION | - |
| in4 | STATE DRIVE | - |
| in5 | REGISTER ACCESS | - |
| in6 | READ/WRITE | LT |
| in7 | b_transport CALL | UT |
| in8 | nb_transport CALL | LT |
| ... | ... | ... |

COMPUTER PRODUCT, IP MODEL GENERATING APPARATUS, AND IP MODEL GENERATING METHOD

CROSS REFERENCE TO RELATED APPLICATIONS

This application is based upon and claims the benefit of priority of the prior Japanese Patent Application No. 2009-038525, filed on Feb. 20, 2009, the entire contents of which are incorporated herein by reference.

FIELD

The embodiments discussed herein are related to a computer product, an IP model generating apparatus, and IP model generating method.

BACKGROUND

A conventional method of automatically generating a source code uses a source code template (see, for example, Japanese Laid-Open Patent Publication No. 2008-052356).

Once an intellectual property (IP) model is developed, derived models and source codes are often prepared based on the IP model and utilizing the source code thereof. Thus, slightly different source codes are generated. The generated source codes are further utilized repeatedly and are branched over and over again. The source codes and the specifications for a model under such circumstances are managed according to type, a relatively large unit by which to manage. This leads to a problem in that the readability of the source codes diminishes and the source codes become un-reusable.

With respect to verification of the developed source code, if the source code is changed partially, the verification is typically partial. However, if the change is undertaken by a different developer, a problem arises in that since the entire source code cannot be checked, verification is insufficient, resulting in the development of model having a bug, which is propagated to the next generation.

Under such circumstances, with the method described above, a problem further arises in that since the template has to assimilate all types, the template code increases explosively by type and the readability of the source code becomes impaired from the beginning.

In ESL model development, optimum abstraction of the model to be developed is determined according to the function to be implemented. The word "optimum" as used herein refers to accuracy and execution speed demanded of the model. The implementation of a model of higher accuracy is more detailed and the implementation of a model of lower accuracy more simplified. A behavior that implements or is implemented by an interface has code dependent on the interface.

An interface suitable for the abstraction, an interface specialized for a target, an interface specialized for a tool, are implemented. A standard interface may be adopted under certain circumstances but the internal structure of the model is implementation-dependent. For this reason, code may not be used commonly between different models or different abstractions. In particular, between a model incorporating a time concept and a model without a time concept, the difference in the interface and the structure is conspicuous and is a significant problem in reducing the man-hours involved in model development.

SUMMARY

According to an aspect of an embodiment, a computer-readable recording medium stores therein an IP model that combines source code of IPs that include an interface representing input/output of data; a register storing the data; a behavior executing processing based on the data; and a state performing wait processing according to time information from the interface and a connection code indicative of a connecting relation between the IPs.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an explanatory diagram of an example of code description for an input interface of an UnTimed model;

FIG. 10 is an explanatory diagram of an example of code description for the input interface of a Timed model;

FIG. 11 is an explanatory diagram of an example of source code of a behavior;

FIG. 14 is an explanatory diagram of an example of code description for the source code of a state of the UnTimed model;

FIG. 15 is an explanatory diagram of an example of code description for a state of the Timed model;

FIG. 17 is an explanatory diagram of an example of source code description for a register referenced by a behavior;

FIG. 18 is an explanatory diagram of an example of source code description for a register updated by a behavior;

FIG. 19 is an explanatory diagram of an example of source code description for register and that does not implement a state;

FIG. 20 is an explanatory diagram of an example of code description for a register initiating a state;

FIG. 21 is an explanatory diagram of an example of code description for a state accessing a register;

FIG. 22 is an explanatory diagram of an example of code description for a state accessing a register;

FIG. 23 is an explanatory diagram of an example of code description for a state initiating a behavior;

FIG. 24 is an explanatory diagram of an example of code description for a state initiating a behavior;

FIG. 25 is an explanatory diagram of an example of source code description for a behavior not implementing an output interface;

FIG. 27 is an explanatory diagram of an example of source code description for an output interface of the UnTimed model;

FIG. 28 is an explanatory diagram of an example of source code description for an output interface of the Timed model;

FIG. 30 is an explanatory diagram of an IP table of an input interface;

FIG. 31 is an explanatory diagram of an IP table of an output interface;

FIG. 32 is an explanatory diagram of an IP table of a behavior;

FIG. 33 is an explanatory diagram of an IP table of a state;

FIG. 34 is an explanatory diagram of an IP table of a register;

FIG. 35 is an explanatory diagram of a connection code table;

DESCRIPTION OF EMBODIMENTS

Preferred embodiments of the present invention will be explained with reference to the accompanying drawings. The disclosed technology is related to IP model (a model utilized in high-level design such as SystemC) management and IP model generation associated with an abstraction model at the level of programmer's view (PV), programmer's view with timing (PVT), cycle approximate (CX), and cycle accurate (CA) of an electronic system level (ESL) tool.

As described, conventionally, addition of an internal state results in an enormous amount of source code and reduced reusability. For example, when there are multiple internal states in one class, processing (operation) upon request from the same external entity differs depending on the internal state. A cause is too much responsibility of one class. This causes the responsibility to be concentrated on the source code or the template as a reference and results in reduced readability and reusability of the source code. Additionally, if the internal states are unitarily fixed to one template, etc., the source code will have an enormous number of lines, diminishing maintainability.

Furthermore, the source code is not portable to other systems nor is a flexible framework built. Typically, this is not a problem within the same development management system but the source code may be unusable due to its inability to provide information when ported to other systems because there is no environment in which the information of the model is able to be managed and extracted.

Therefore, the IP model of the ESL are separated into three configurations (IPs) of interface, register, and behavior. An interface is an IP representing the input/output of data; a register is an IP representing data memory; and a behavior is an IP representing the behavior of an object to be designed using the data. The three configurations and the connecting relations among them are modeled. The behavior is made as a component and utilizes refactored coding.

Figure 1:
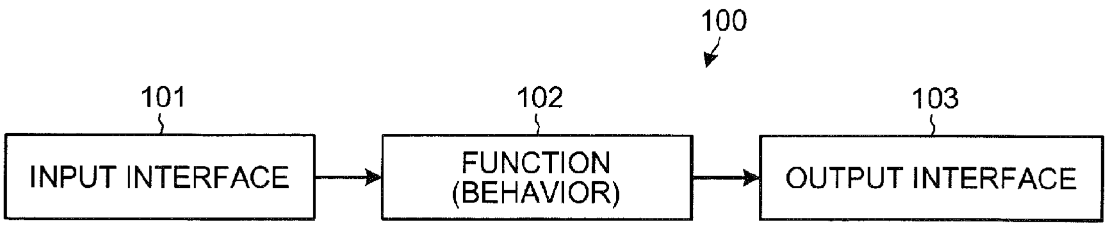
FIG. 1 is a block diagram of one example of an IP model.

FIG. 1 is a block diagram of one example of an IP model. In an IP model 100 depicted in FIG. 1, triggered by an input from an input interface 101 (or spontaneously in the case of a thread), a function (behavior) 102 is initiated and results of the operation are output to an output interface 103. In terms of hardware, the interface and the behavior may correspond to the type of input/output or the behavior may stretch over multiple stages. Such examples are depicted in FIG. 2.

Figure 2:
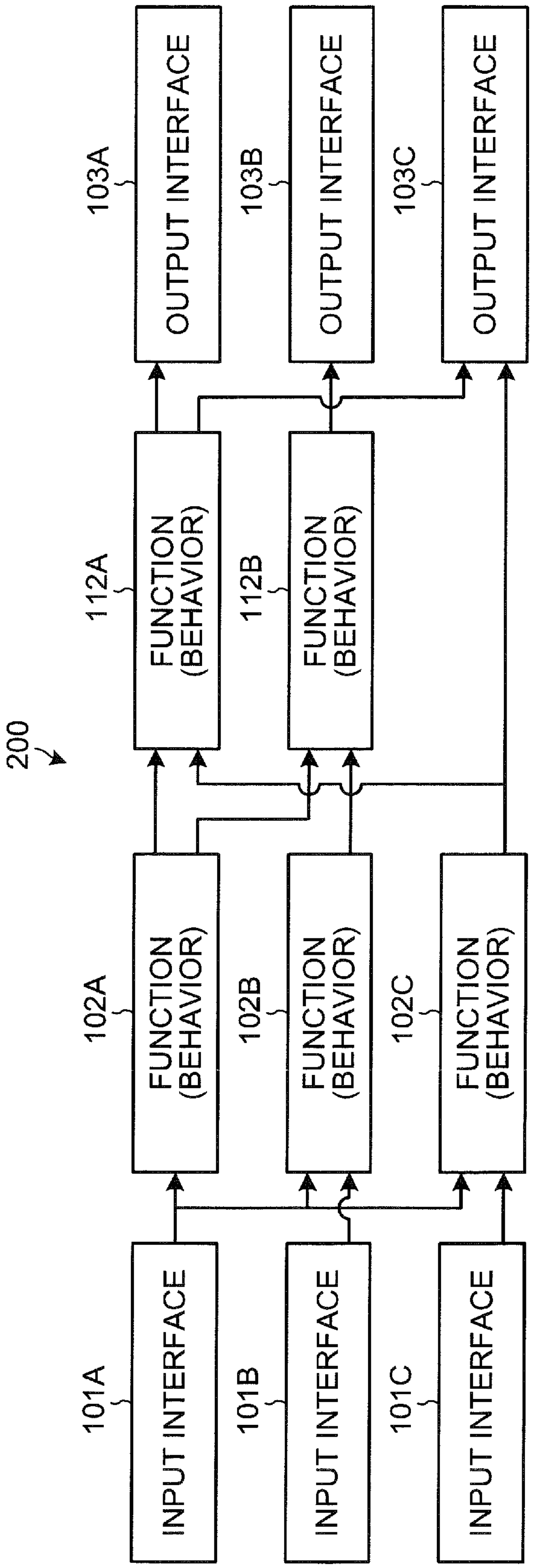
FIG. 2 is a block diagram of another example of the IP model.

FIG. 2 is a block diagram of another example of the IP model. In the IP model 200 depicted in FIG. 2, triggered by an input from the input interface 101A, the function (behavior) 102A is initiated. Triggered by the input from the input interfaces 101A and 101B, the function (behavior) 102B is initiated. Triggered by the input from the input interfaces 101A and 101C, the function (behavior) 102C is initiated and the results of the operation are output to the function (behavior) 112A and the output interface 103C.

Upon reception of the results of the operation of the functions (behaviors) 102A and 102C, the function (behavior) 112A is initiated and the results of the operation are output to the output interfaces 103A and 103C. Upon reception of the results of the operation of the functions (behaviors) 102A and 102B, the function (behavior) 112B is initiated and the results of the operation are output to the output interface 103B.

Figure 3:
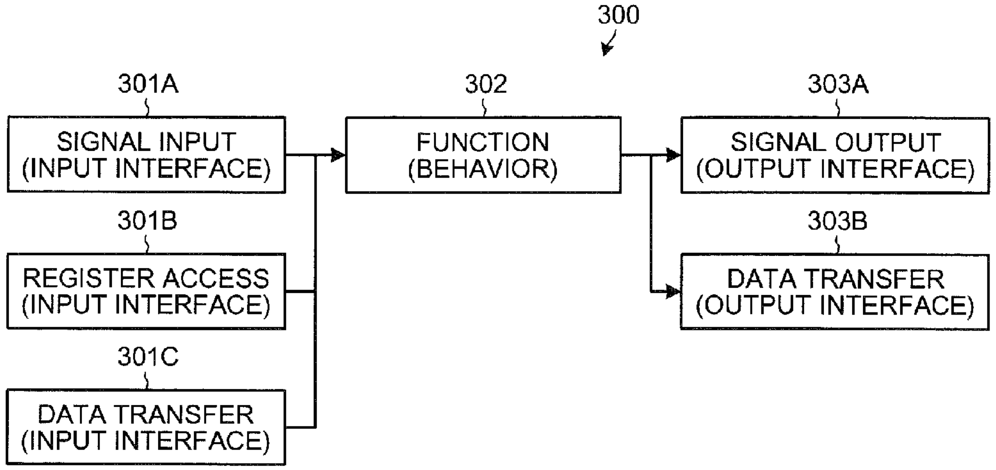
FIG. 3 is a block diagram of one example of the IP model for hardware.

FIG. 3 is a block diagram of one example of the IP model for hardware. Generally, in modeling hardware, a behavior is caused to occur, triggered by an external input of a signal, register access, data transfer, etc., and the results of processing are obtained (by way of a similar interface). In an IP model 300 of depicted in FIG. 3, an input interface 301A is an interface that receives the signal and causes a function (behavior) 302 to occur.

An input interface 301B is an interface that cause the function (behavior) 302 to access a register (read and write). An input interface 301C is an interface that receives data input and causes the function (behavior) 302 to transfer data. The function (behavior) 302 is initiated upon reception of a signal input through the input interface 301A and outputs the results of the operation to the output interface 303A.

The function (behavior) 302 is initiated upon reception of data input through the input interface 301C and outputs the data to the output interface 303B. Thus, the function (behavior) 302 is initiated in response to the signal, the register access, and the data transfer, has a control register, a state register, and memory information.

Figure 4:
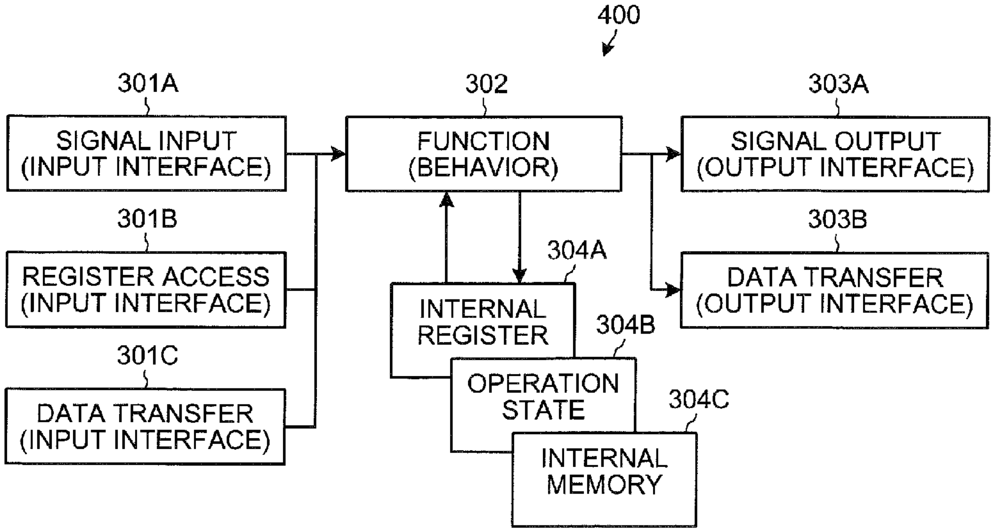
FIG. 4 is a block diagram of an expanded example of the IP model for hardware.

FIG. 4 is a block diagram of an expanded example of the IP model for hardware. In an IP model 400 depicted in FIG. 4, the function (behavior) 302 operates by accessing the control register (internal register 304A), the state register (operation state 304B), and the memory information (internal memory 304C).

A basic configuration includes the IPs of the input interface, the output interface, the behavior, the state, the register, etc. To connect these components, the implementation of an application program interface (API) and event notification (Event) is governed by rules. A state performs waiting processing according to time information (delay) from the interface. A state corresponds to the internal register 304A, the operation state 304B, and the internal memory 304C depicted in FIG. 4.

Figure 5:
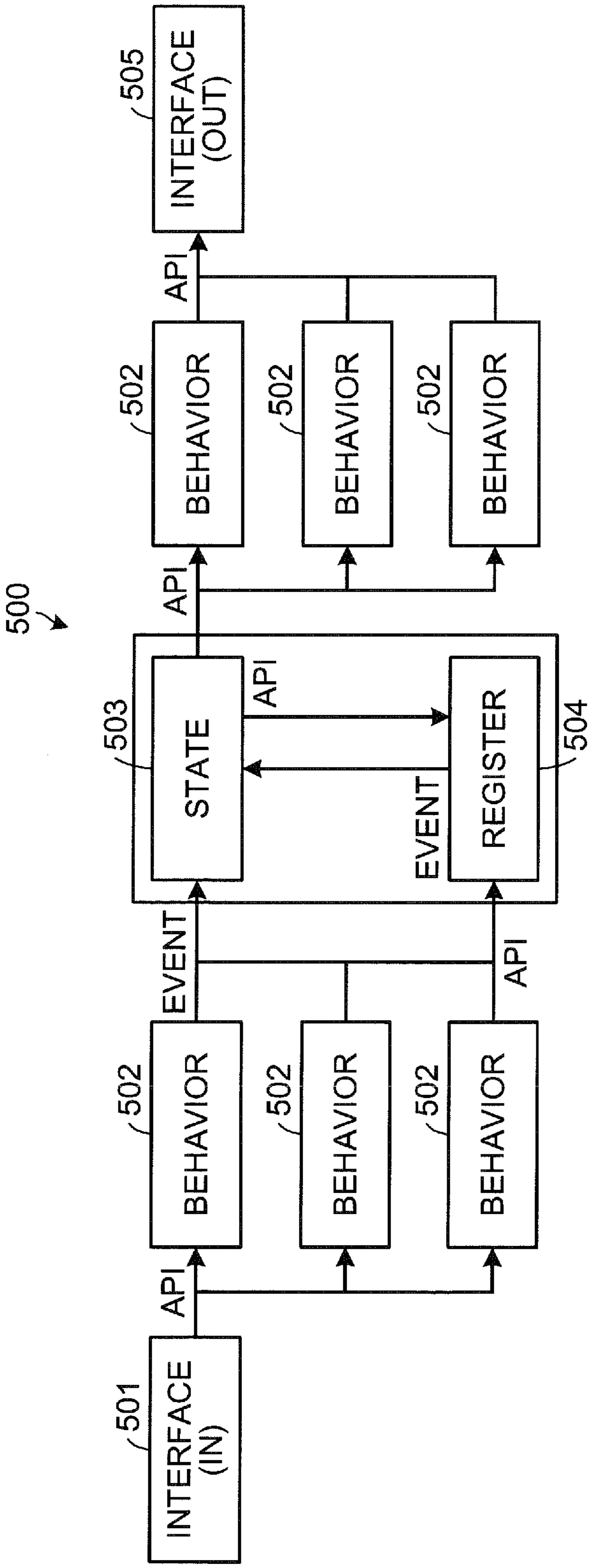
FIG. 5 is a block diagram of one example of a re-configurable IP model according to the present embodiments.

FIG. 5 is a block diagram of one example of a re-configurable IP model according to the present embodiments. An IP model 500 is one example and the number of components and the connecting relations (arrows in FIG. 5, corresponding to the API and event notification) are freely configurable according to the hardware that is to be designed. Therefore, plural components and connecting relations may be prepared depending on the hardware to be designed. In the case of improving the same hardware, a derivative model is generated from the original model configuration.

In the IP model 500, when the API is called from the input interface 501, each behavior 502 (first behavior) occurs, notifying the state 503 of the event and also calling the API to the register 504.

When the state 503 calls the API to the register 504, event notification is sent from the register 504. Upon reception of the event notification, the state 503 calls the API to each behavior 502 (second behavior), whereby each behavior 502 (second behavior) occurs and the results of the operation are output to the output interface 505.

The six behaviors depicted in FIG. 5 are of the same basic structure but behave (operate) differently (alternatively, may be designed to behave in the same manner). For example, by simply changing description of the operation, a different behavior may be obtained. This is not limited to behavior, but is true for the interface, the state, and the register as well.

Figure 6:
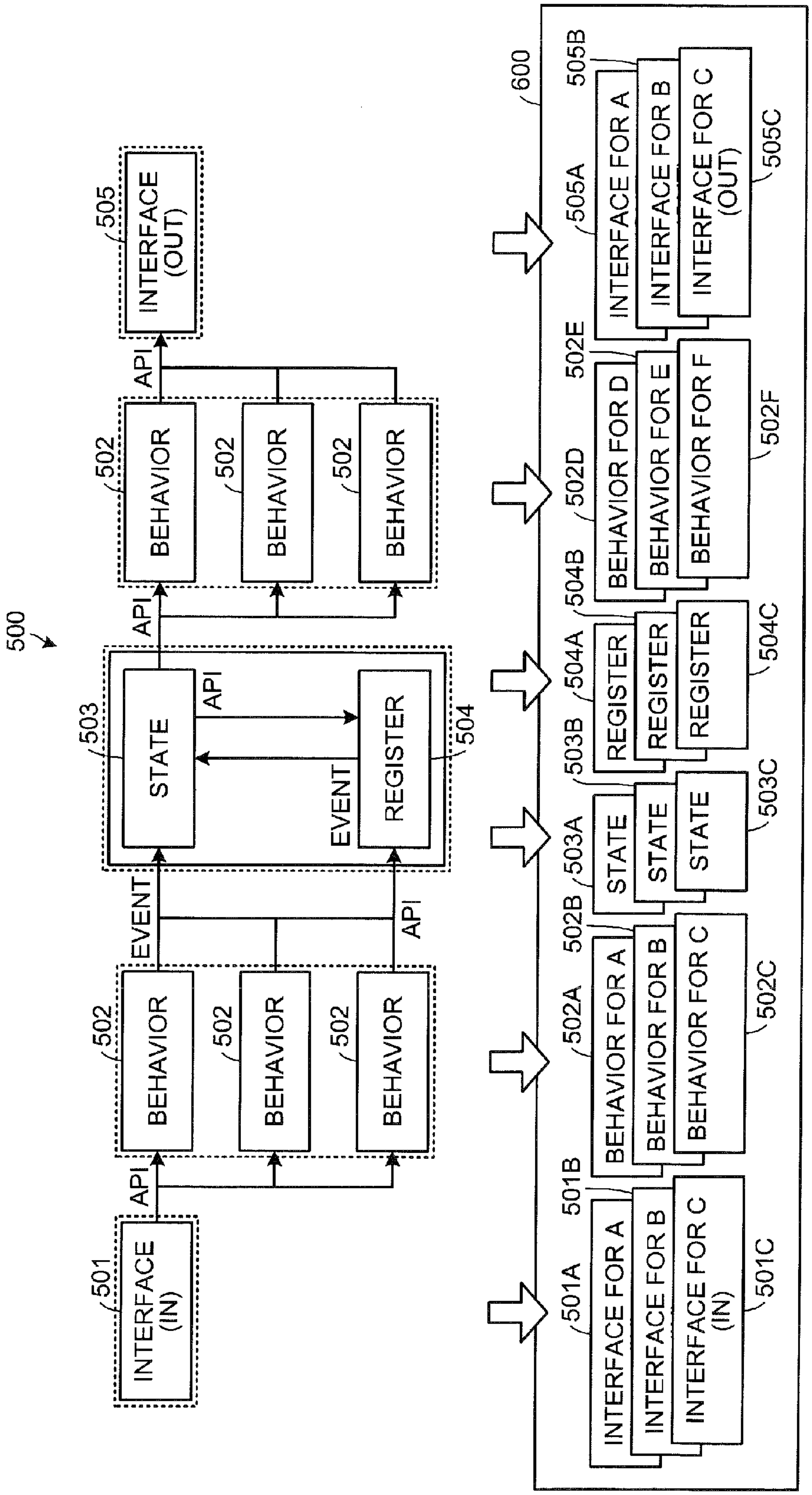
FIG. 6 is an explanatory diagram of a re-configuration example of the model configuration depicted in FIG. 5.

FIG. 6 is an explanatory diagram of a re-configuration example of the model configuration depicted in FIG. 5. In FIG. 6, the components 501 to 505 of the IP model 500 may be freely recombined from library 600 as necessary. This recombination is performed by the designer accessing the library and performing manual operation from a terminal. For example, the input interface 501 will incorporate the IP selected from among the input interfaces 501A, 501B, and 501C.

Likewise, each behavior 502 (first behavior) will incorporate the IP selected from among the behaviors 502A, 502B, and 502C. Similarly, each behavior 502 (second behavior) will incorporate the IP selected from among the behaviors 502D, 502E, and 502F. The state 503 will incorporate the IP selected from among the states 503A, 503B, and 503C; and the register 504 will incorporate the IP selected from among the registers 504A, 504B, and 504C.

Similarly, the output interface 505 will incorporate the IP selected from among the output interfaces 505A, 505B, and 505C. In this manner, modification and/or improvement may be achieved by simply recombining the IPs while maintaining the connecting relations (line-arrows in FIG. 6, corresponding to the API and event notification) between the components. Though not depicted, each IP may be prepared and stored in the library 600 for each tool to be used, thereby enabling the IP model itself to be configured to be independent of the tools, enhancing versatility.

In developing a similar model or derivative model, the similar model or the derivative model may be developed with minimal changes by simply using the IPs registered in the library 600 or using an IP newly registered in the library 600 after modification of an IP registered in the library 600. Since the basic configuration of the similar model or the derivative model is not different from that of the original IP model 500, the similar model or the derivative model may be developed merely by replacement of the IPs.

Each behavior 502 has time information (delay) for the operation. In the case of using an interface dealing with the time information, each behavior 502 communicates the time information (delay) with an external entity by way of the interface. For this reason, processing of time concept may be performed by obtaining the time information (delay) and performing the waiting processing at the state 503.

The re-configurable IP model enables building of an UnTimed model to which the time concept not introduced and a Timed (also referred to as Loosely Timed (LT)) model to which the time concept is introduced. Further, commonality of the UnTimed model and the Timed model may be achieved merely by replacing (the IPs) of the interface and the state.

Figure 7:
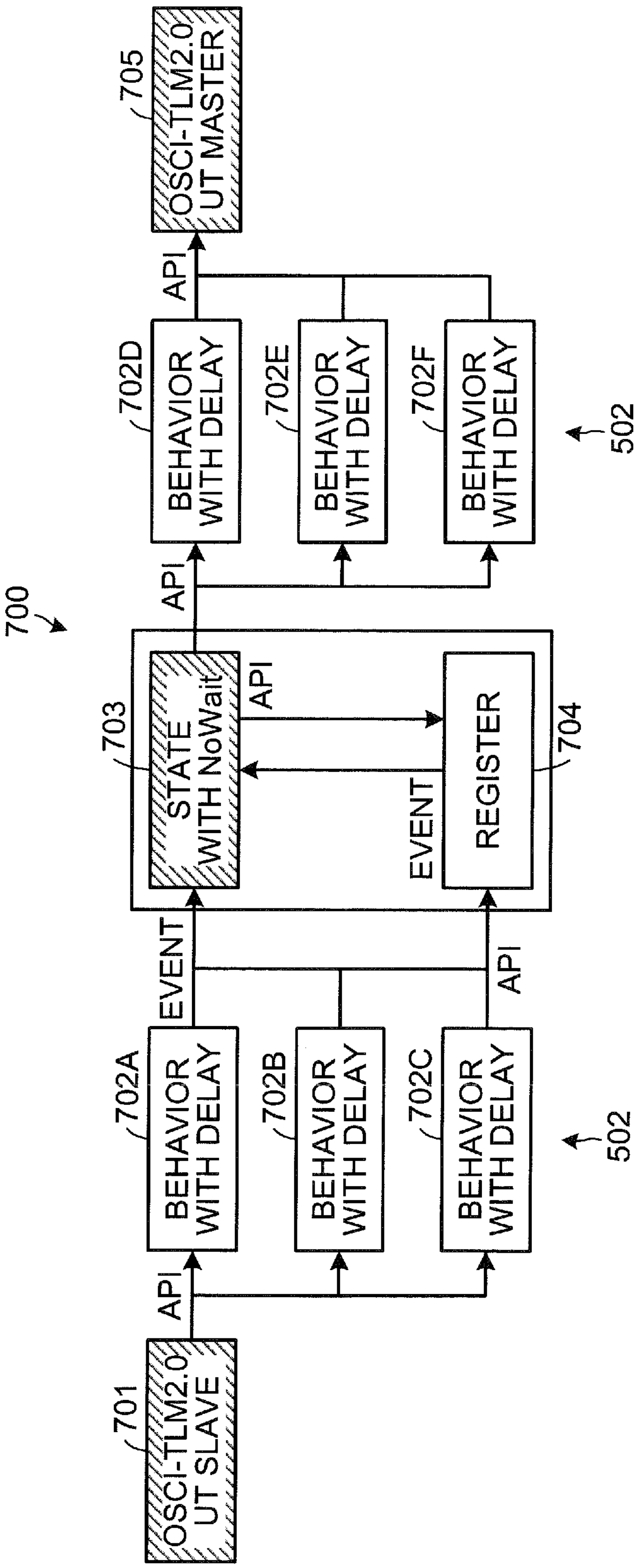
FIG. 7 is an explanatory diagram of the model configuration (UnTimed model) where the time concept is not introduced into the re-configurable IP model of FIG. 5.
Figure 8:
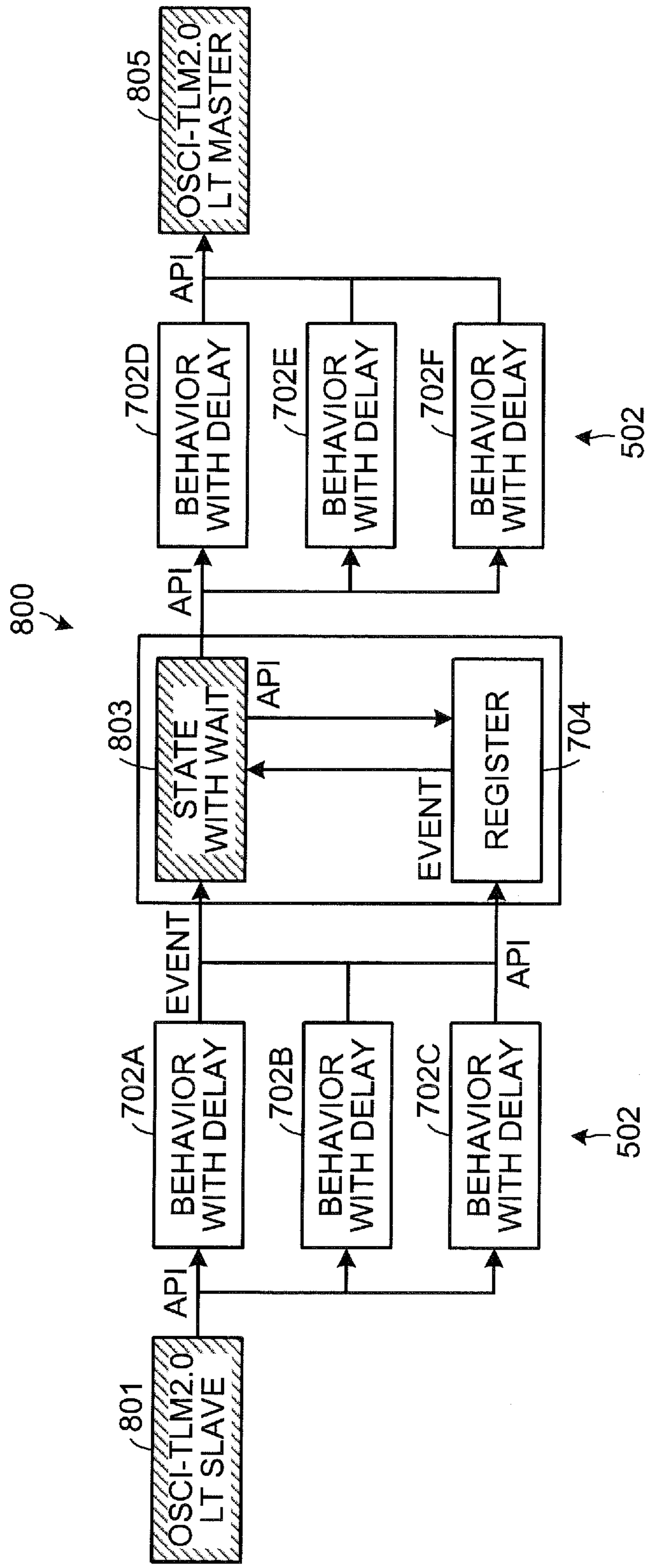
FIG. 8 is an explanatory diagram of the model configuration (Timed model) where the time concept is introduced into the re-configurable IP model of FIG. 5

FIG. 7 is an explanatory diagram of the model configuration (UnTimed model) where the time concept is not introduced into the re-configurable IP model of FIG. 5. FIG. 8 is an explanatory diagram of the model configuration (Timed model) where the time concept is introduced into the re-configurable IP model of FIG. 5. FIGS. 7 and 8 represent examples of application to open systemC initiative (OSCI)-transaction level modeling (TLM) 2.0.

An IP model 700 as an UnTimed model may be changed to an IP model 800 as a Timed model by merely replacing the input interface 701, the state 703, and output interface 705 with the input interface 801, the state 803, and the output interface 805, respectively, while the behaviors 502 (702A to 702F) are left as they are.

Similarly, the IP model 800 as a Timed model may be changed to an IP model 700 as an UnTimed model by merely replacing the input interface 801, the state 803, and output interface 805 with the input interface 701, the state 703, and the output interface 705, respectively, while the behaviors 502 (702A to 702F) are left as they are.

FIG. 9 is an explanatory diagram of an example of code description for the input interface 701 of the UnTimed model. Code 900 depicted in FIG. 9 is code formed by inserting into source code 901 of the input interface 701 of the UnTimed model, connection code 902 to initiate the behavior 502 via the input interface 701. This connection code 902, i.e., code not having the time concept introduced thereto, is common to all behaviors 502.

Since the behaviors 702A to 702C are initiated via the input interface 701 depicted in FIG. 7, an if-statement in the source code 901 of the input interface 701 is described for each of the behaviors 702A to 702C. The connection code 902 is described to enable identification of each of the behaviors 702A to 702C.

FIG. 10 is an explanatory diagram of an example of code description for the input interface 801 of the Timed model. Code 1000 depicted in FIG. 10 is code formed by inserting into a source code 1001 of the input interface 801 of the Timed model, a connection code 1002 to initiate the behavior 502 via the input interface 801. This connection code 1002, i.e., code not having the time concept introduced thereto, is common to all behaviors 502.

Since the behaviors 702A to 702C are initiated via the input interface 801 depicted in FIG. 8, an if-statement in the source code 1001 of the input interface 801 is described for each of the behaviors 702A to 702C. The connection code 1002 is described to enable identification of each of the behaviors 702A to 702C.

FIG. 11 is an explanatory diagram of an example of the source code of the behavior 502. A source code 1100 of the behavior 502 depicted in FIG. 11 is common to the UnTimed model and the Timed model. Description of inherent behavior between "//PROCESS" and "delay+=t;" in the source code 1100 will produce the behaviors 702A to 702F. The source code 1100 of the behaviors 702A to 702F may be pre-registered in the library 600.

Figure 12:
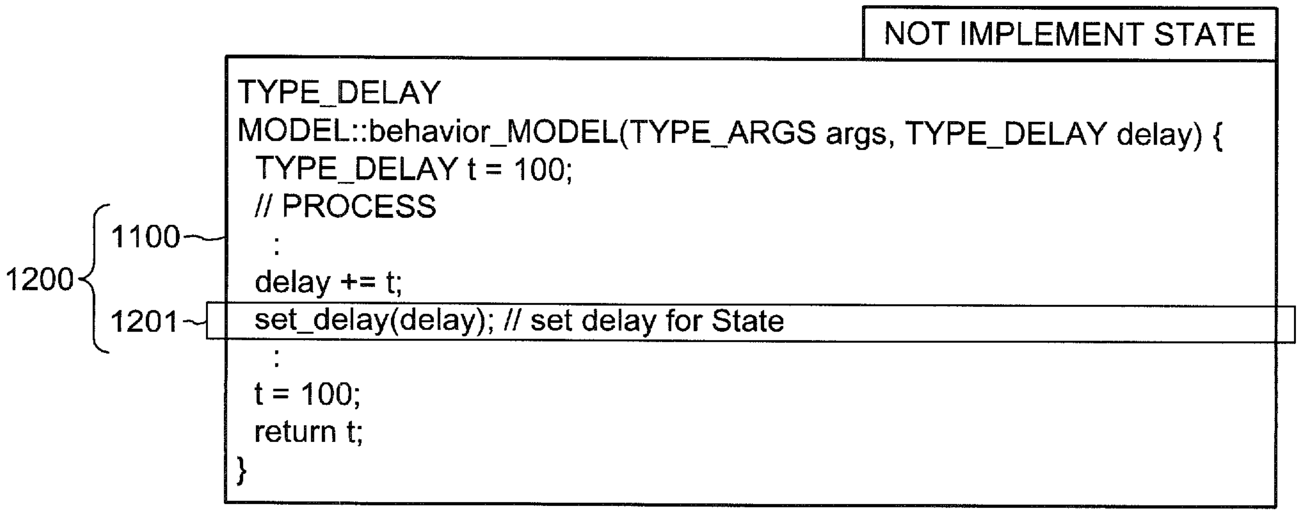
FIG. 12 is an explanatory diagram of a description example of the source code of a behavior having description of code to not implement a state 503.

FIG. 12 is an explanatory diagram of a description example of the source code of the behavior 502 having description of code to not implement the state 503. A source code 1200 of the behavior 502 depicted in FIG. 12 is common to the UnTimed model and the Timed model. The source code 1200 is the source code 1100 having inserted therein code 1201 to not implement the state 503. In the same manner as in the source code 1100, description of inherent behavior between "//PROCESS" and "delay+=t;" will produce the behaviors 702A to 702C to not implement the state 503. The source code 1200 of the behaviors 702A to 702C to not implement the state 503 may be pre-registered in the library 600.

Figure 13:
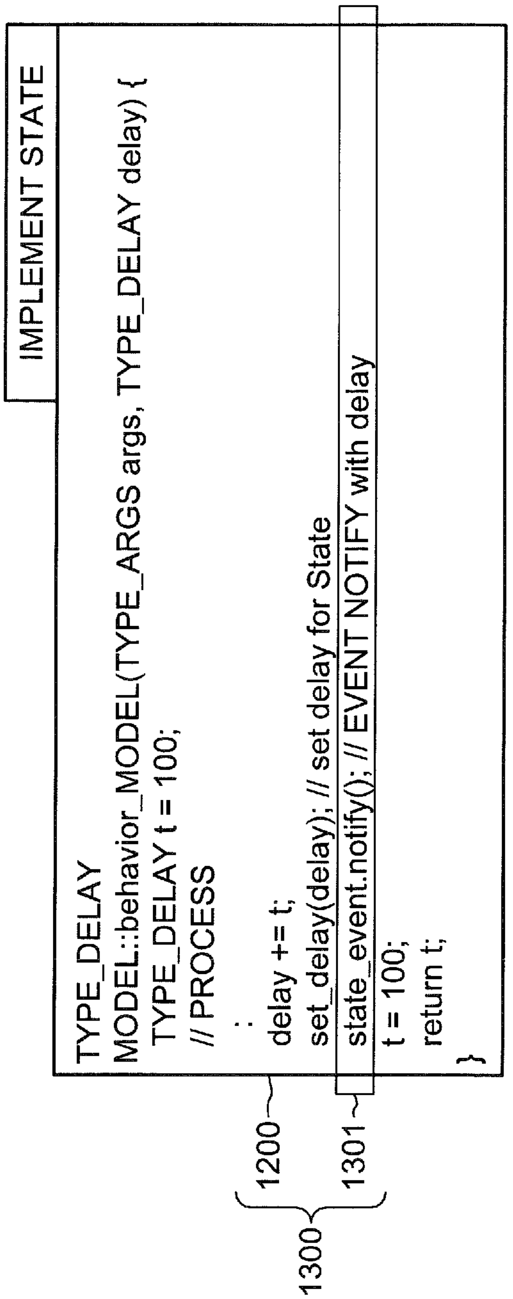
FIG. 13 is an explanatory diagram of a description example of the source code of a behavior having description of code to implement a state.

FIG. 13 is an explanatory diagram of a description example of the source code of the behavior 502 having description of code to implement the state 503. A source code 1300 of the behavior 502 depicted in FIG. 13 is common to the UnTimed model and the Timed model. The source code 1300 is the source code 1200 having inserted therein a connection code 1301 to implement the state 503. In the same manner as in the source code 1200, description of inherent behavior between "//PROCESS" and "delay+=t;" will produce the behaviors 702A to 702C to implement the state 503. The source code 1200 and the connection code 1301 may be pre-registered in the library 600.

FIG. 14 is an explanatory diagram of an example of code description for the source code of the state 703 of the UnTimed model. Code 1400 depicted in FIG. 14 is code formed by inserting into a source code 1401 of the state 703 of the UnTimed model, a connection code 1402 executed via the behavior 502.

Since the state 703 is implemented via the behaviors 702A to 702C depicted in FIG. 7, a case-statement in the source code 1401 of the state 703 is described with respect to each of the behaviors 702A to 702C. The source code 1401 of the state 703 and the connection code 1402 may be pre-registered in the library 600.

FIG. 15 is an explanatory diagram of an example of code description for the state 803 of the Timed model. Code 1500 depicted in FIG. 15 is code formed by inserting into a source code 1501 of the state 803 of the Timed model, the connection code 1402 executed via the behavior 502. Code 1502 is code to wait for a period of time (delay) in the state 803 to thereby introduce the time concept.

Since the state 803 is implemented via the behaviors 702A to 702C depicted in FIG. 8, a case-statement in the source code 1501 of the state 803 is described with respect to each of the behaviors 702A to 702C. The source code 1501 of the state 803 and the connection code 1402 may be pre-registered in the library 600.

Figure 16:
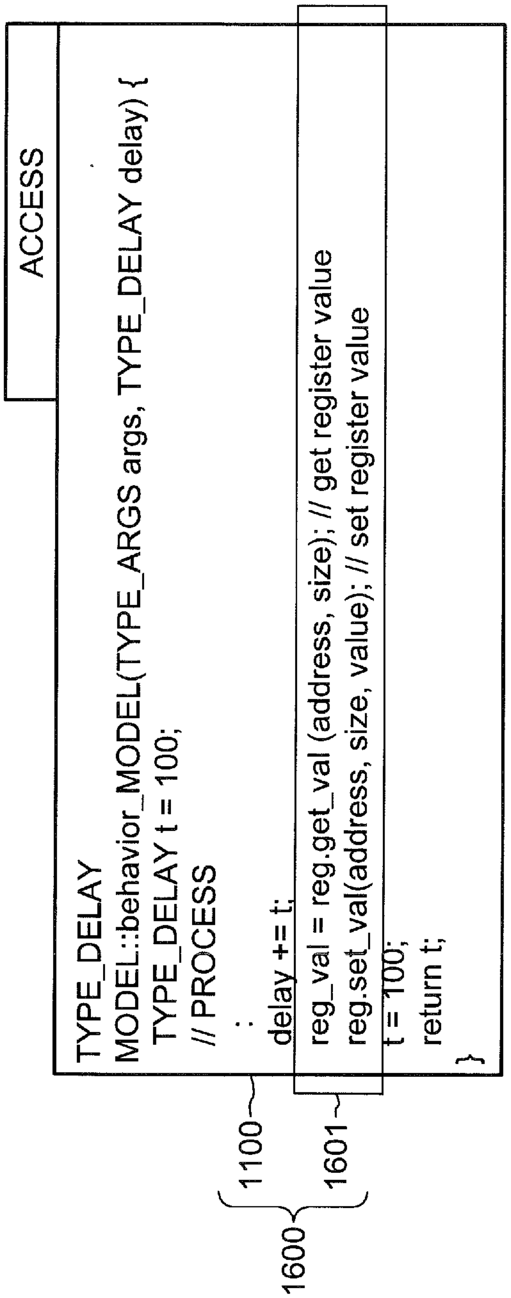
FIG. 16 is an explanatory diagram of an example of code description for a behavior accessing a register.

FIG. 16 is an explanatory diagram of an example of code description for the behavior 502 accessing the register 704. Code 1600 is code formed by inserting into the source code 1100 of the behavior 502, connection code 1601 indicating access to the register 704 by the behavior 502. In the connection code 1601, "reg.get_val" represents referencing of the register 704 and "reg.set_val" represents updating of the register 704.

Description of inherent behavior between "//PROCESS" and "delay+=t;" in the source code 1100 will produce the behaviors 702A to 702C accessing the register 704. The source code 1100 of the behaviors 702A to 702C accessing the register 704 and the connection code 1601 may be pre-registered in the library 600.

FIG. 17 is an explanatory diagram of an example source code description for the register 704 referenced by the behavior 502. This source code 1700 is described to enable identification of the behavior 502 (behavior 702A to 702C) as a reference source. The source code 1700 may be pre-registered in the library 600.

FIG. 18 is an explanatory diagram of an example of source code description for the register 704 updated by the behavior 502. This source code 1800 is described to enable identification of the behavior 502 (behavior 702A to 702C) as an updating source. The source code 1800 may be pre-registered in the library 600.

FIG. 19 is an explanatory diagram of an example of source code description for the register 704 and that does not implement the state 703. This source code 1900 is code includes the source code 1700 depicted in FIG. 17 and the source code 1800 depicted in FIG. 18. The source code 1900 is described to enable identification of the behavior 502 (behavior 702A to 702C) as an access origin. The code 1900 may be pre-registered in the library 600.

FIG. 20 is an explanatory diagram of an example of code description for the register 704 initiating the state 703. This code 2000 is the source code 1900 having inserted therein connection code 2001 to initiate the state 703 via the register 704. The connection code 2001 is code to give notification of a state event (state_Event). This code 2001 is described to enable identification of the behavior 502 (behaviors 702A to 702C) as an access origin. The code 2000 and the connection code 2001 may be pre-registered in the library.

FIG. 21 is an explanatory diagram of an example of code description for the state 703 accessing the register 704. This code 2100 is code formed by inserting into the code 1400 (the source code 1401 and the connection code 1402) of the state 703 depicted in FIG. 14 and has inserted therein, connection code 2101 to access the register 704. The connection code 2101 is code to reference (reg.get_val) and update (reg.set_val) the register 704. The code 2100 and the connection code 2101 may be pre-registered in the library 600.

FIG. 22 is an explanatory diagram of an example of code description for the state 803 accessing the register 704. This code 2200 is code formed by inserting into the code 1500 (the source code 1501 and the code 1502) of the state 803 depicted in FIG. 15, connection code 2101 to access the register 704. The connection code 2101 is code to reference (reg.get_val) and update (reg.set_val) the register 704. The code 2200 may be pre-registered in the library 600.

FIG. 23 is an explanatory diagram of an example of code description for the state 703 initiating the behavior 502. This code 2300 is code formed by inserting into the code 1400 of the state 703 depicted in FIG. 14, connection code 2301 to initiate the behavior 502. The code 2300 is described to enable identification of the behavior 502 (the behaviors 702D to 702F) to be initiated. The code 2300 may be pre-registered in the library 600.

FIG. 24 is an explanatory diagram of an example of code description for the state 803 initiating the behavior 502. This code 2400 is code formed by inserting into the code 1500 of the state 803 depicted in FIG. 15, the connection code 2301 to drive the behavior 502. The code 2400 is described to enable identification of the behavior 502 (the behaviors 702D to 702F) to be initiated. The code 2400 may be pre-registered in the library 600.

FIG. 25 is an explanatory diagram of an example of source code description for the behavior 502 and not implementing the output interface 505. This source code 2500 does not perform reading or writing, and is common to the UnTimed model and the Timed model. Description of inherent behavior between "//PROCESS" and "delay+=t;" in the source code 2500 will produce the behaviors 702D to 702F. The code of the behaviors 702D to 702F may be pre-registered in the library 600.

Figure 26:
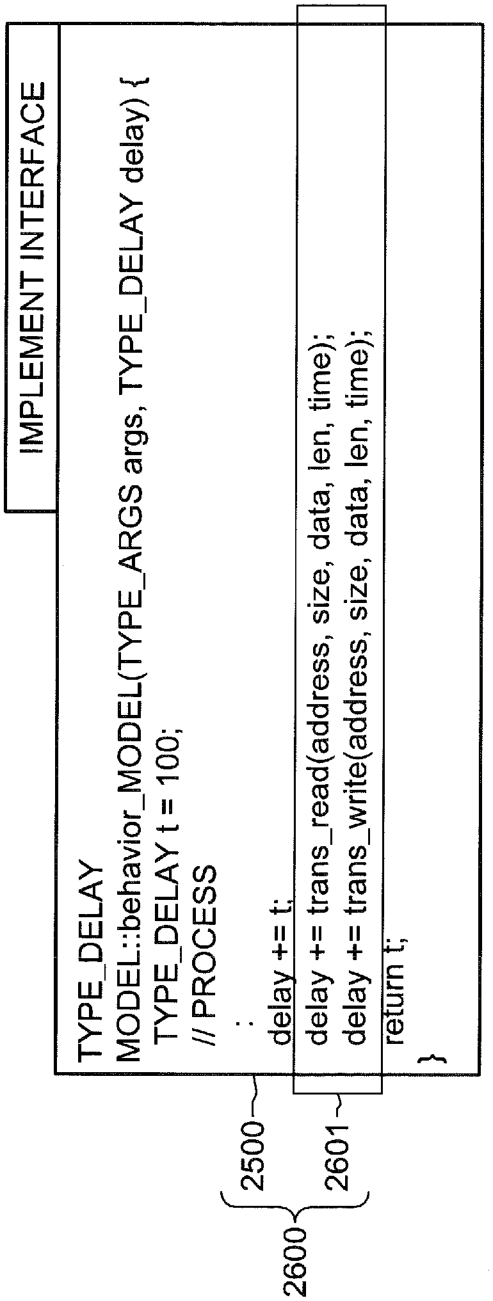
FIG. 26 is an explanatory diagram of an example of source code description for a behavior implementing an output interface.

FIG. 26 is an explanatory diagram of an example of source code description for the behavior 502 implementing the output interface 505. This code 2600 is code formed by inserting into the source code 2500 of the behavior 502 depicted in FIG. 25, connection code 2601 to implement the output interface 505 via the behavior 502.

The connection code 2601 is code to perform reading (trans_read) and writing (trans_write). The code 2600 is common to the UnTimed model and the Timed model. Description of inherent behavior between "//PROCESS" and "delay+=t;" in the code 2600 will produce the behaviors 702D to 702F. The code 2600 and the connection code 2601 may be pre-registered in the library 600.

FIG. 27 is an explanatory diagram of an example of source code description for the output interface 705 of the UnTimed model. Code 2700 is code formed by inserting into source code 2701 of the output interface 705 of the UnTimed model, connection code 2702 to implement the output interface 705 via the behavior 502. The connection code 2702 is code to call opposed "b_tranport".

FIG. 28 is an explanatory diagram of an example of source code description for the output interface 805 of the Timed model. Code 2800 is code formed by inserting into source code 2801 of the output interface 705 of the Timed model, connection code 2802 to implement the output interface 705 via the behavior 502. The connection code 2802 is code to call opposed "b_tranport".

Figure 29:
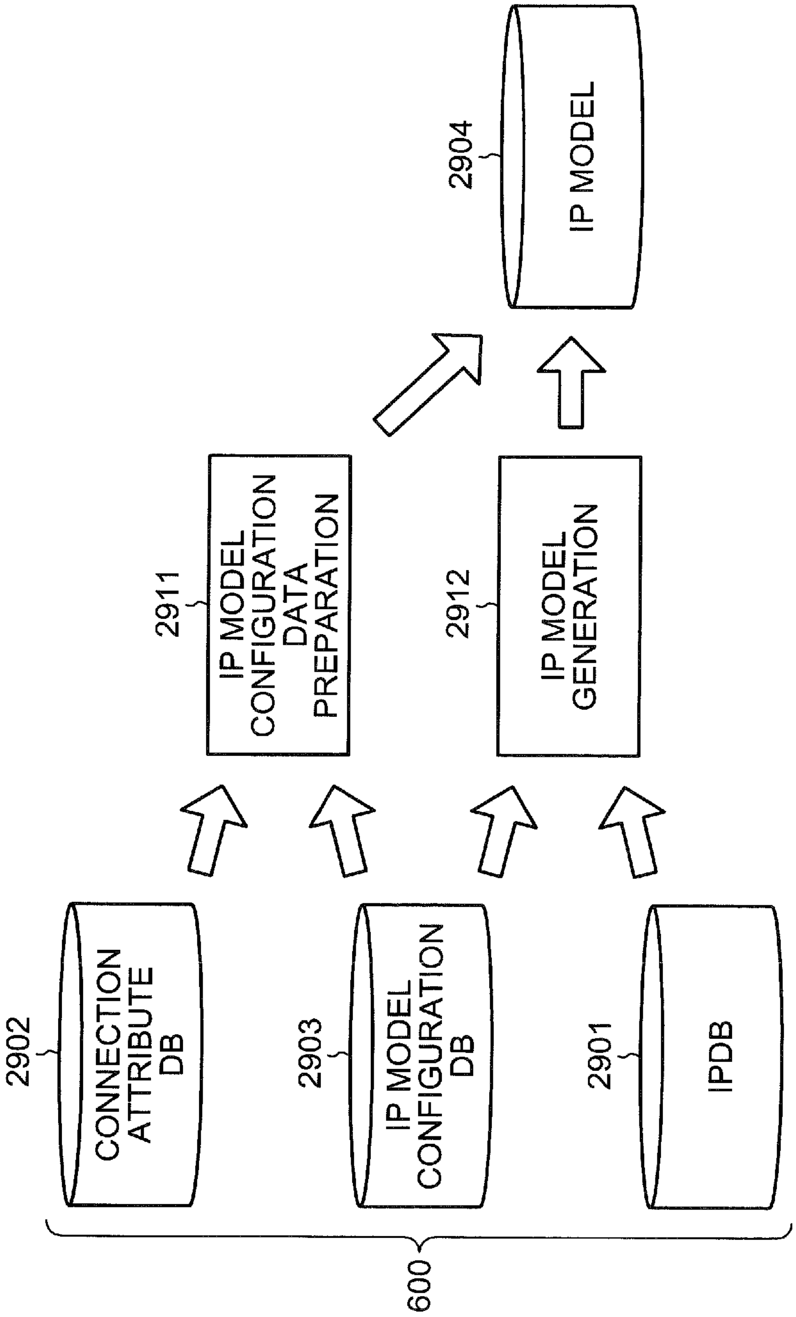
FIG. 29 is a schematic diagram of IP model management and generation of the disclosed technology.

FIG. 29 is a schematic diagram of IP model management and generation of the disclosed technology. According to the disclosed technology, IP database (DB) 2901, IP model configuration DB 2903, and connection attribute DB 2902 are accessed to perform IP model configuration data preparation 2911 and IP model generation 2912. The IPDB 2901, the connection attribute DB 2902, and the IP model configuration DB 2903 make up the library 600.

The IPDB 2901 is the database storing therein the IP and, for example, stores the source codes 901, 1001, 1100, 1200, 1401, 1501, 1700, 1800, 1900, 2500, 2701, and 2801.

FIG. 30 is an explanatory diagram of an IP table of the input interface; FIG. 31 is an explanatory diagram of the IP table of the output interface; FIG. 32 is an explanatory diagram of the IP table of the behavior; FIG. 33 is an explanatory diagram of the IP table of the state; and FIG. 34 is an explanatory diagram of the IP table of the register.

In each of the IP tables 3000 to 3400, each record includes an ID, an IP attribute, a model attribute, a connection code ID, and a parent element. The ID is identification information to identify the IP of the record. The IP attribute is information representing a feature of the IP of the record. The model attribute is information indicating whether the IP of the record is applied to the UnTimed model ("UT" in the table), is applied to the Timed model ("LT" in the table), or is common to both models ("-" in the table).

The connection code ID is identification information of the connection code insertable to the IP of the record. Access to the IP tables 3000 to 3400 enables the source code of the IP to be drawn out of the IPDB 2901. The parent element stores the parent IP (a pointer thereto) of the IP of the record.

The connection attribute DB 2902 is a database storing therein the connection code and for example, stores the connections codes 902, 1002, 1301, 1402, 1601, 2001, 2101, 2301, 2601, 2702, and 2802.

FIG. 35 is an explanatory diagram of a connection code table. The connection code table 3500 includes an ID (connection code ID), an IP attribute, a model attribute, a connection attribute, and a parent element for each record. The connection attribute is information representing a feature of the connection code of the record.

The IP model configuration DB 2903 is a database storing therein the IP model configuration data of the IP models 100 to 800 depicted in FIGS. 1 to 8. The IP model configuration DB 2903 includes a configuration ID and IP model configuration data for each record. The configuration ID is identification information to identify the IP model configuration data. The IP model configuration data is data prepared by the designer and represents a block configuration of the IP model as the object to be designed.

The IP model configuration data is stored as GUI expressing the IP as a block and the connection code as an arrow, as depicted in FIGS. 1 to 8. The block is linked to the ID in the IP table depicted in FIGS. 30 to 34 and the arrow is linked to the ID in the connection code table depicted in FIG. 35. Therefore, selection of a block will extract the source code of its IP from the IPDB and likewise, selection of an arrow will extract its connection code from the connection attribute DB.

The explanation with reference to FIG. 29 continues. The IP model configuration data preparation 2911 is processing of preparing the IP model configuration data by designer operation of a computer. The IP model generation 2912 is processing of generating the IP model 2904 by automatically upon the designer giving a generating instruction to the computer.

Through such management/generation of the IP model 2904, improvement of the reusability of the connection attributes between IPs making up the IP model 2904 is achieved. By dividing processing and localizing places of modification, improvement of the reusability is achieved. This localization makes it possible to narrow down the range of verification for derivative types. Therefore, the template needs not assimilate all types and there is no occurrence of the template code explosively increasing according to type. Therefore, since the readability of the source code is not impaired and bugs do not propagate, improved quality of the IP model is achieved.

Figure 36:
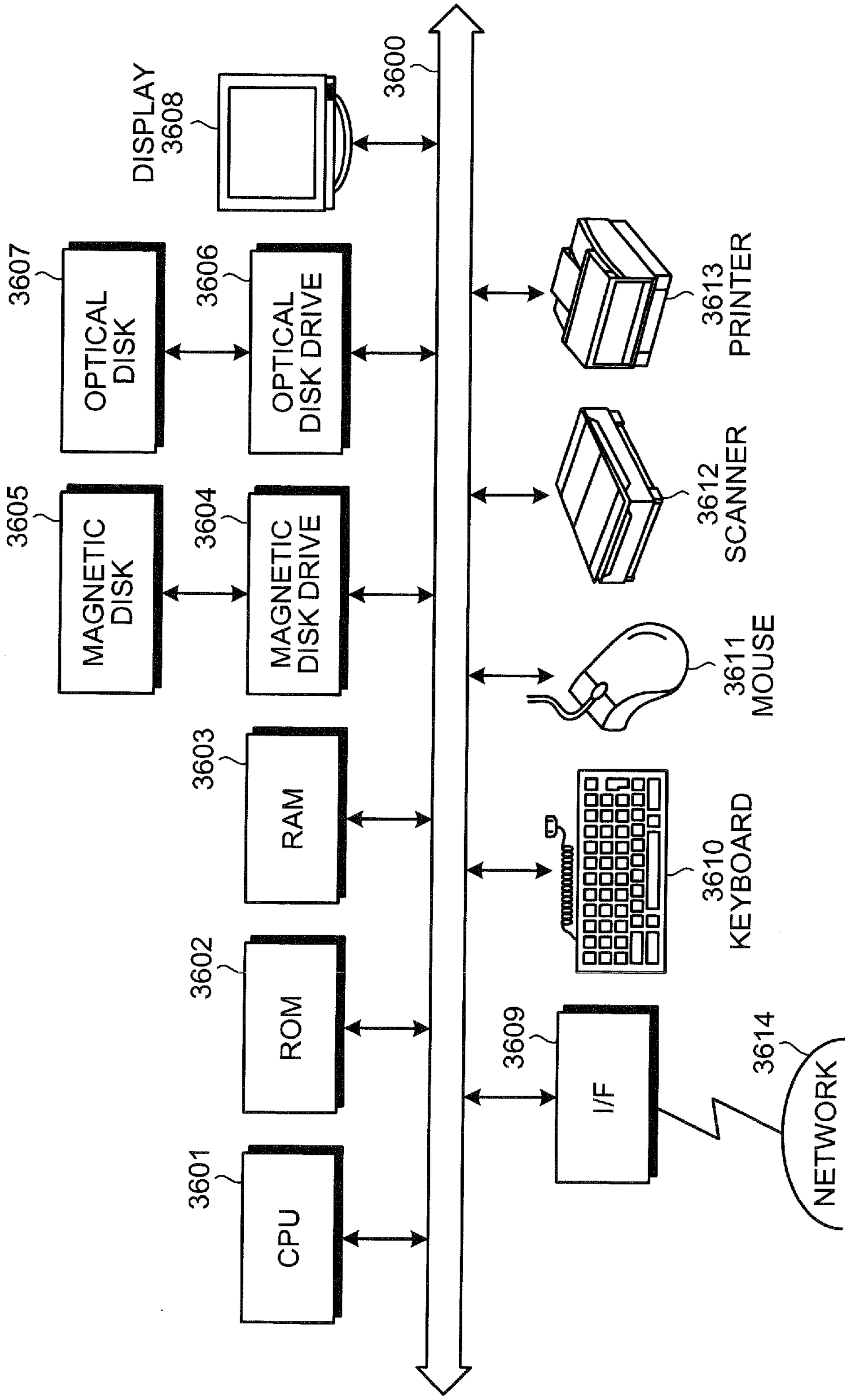
FIG. 36 is a block diagram of an IP model generating apparatus according to the embodiments.

FIG. 36 is a block diagram of an IP model generating apparatus according to the embodiment. As depicted in FIG. 36, the IP model generating apparatus includes a central processing unit (CPU) 3601, a read-only memory (ROM) 3602, a random access memory (RAM) 3603, a magnetic disk drive 3604, a magnetic disk 3605, an optical disk drive 3606, an optical disk 3607, a display 3608, a interface (I/F) 3609, a keyboard 3610, a mouse 3611, a scanner 3612, and a printer 3613, respectively connected by a bus 3600.

The CPU 3601 governs overall control of the IP model generating apparatus. The ROM 3602 stores therein programs such as a boot program. The RAM 3603 is used as a work area of the CPU 3601. The magnetic disk drive 3604, under the control of the CPU 3601, controls the reading and writing of data with respect to the magnetic disk 3605. The magnetic disk 3605 stores therein the data written under control of the magnetic disk drive 3604.

The optical disk drive 3606, under the control of the CPU 3601, controls the reading and writing of data with respect to the optical disk 3607. The optical disk 3607 stores therein the data written under control of the optical disk drive 3606, the data being read by a computer.

The display 3608 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 3608.

The I/F 3609 is connected to a network 3614 such as a local area network (LAN), a wide area network (WAN), and the Internet through a communication line and is connected to other apparatuses through the network 3614. The I/F 3609 administers an internal interface with the network 3614 and controls the input/output of data from/to external apparatuses. For example, a modem or a LAN adaptor may be employed as the I/F 3609.

The keyboard 3610 includes, for example, keys for inputting letters, numerals, and various instructions and performs the input of data. Alternatively, a touch-panel-type input pad or numeric keypad, etc. may be adopted. The mouse 3611 is used to move the cursor, select a region, or move and change the size of windows. A track ball or a joy stick may be adopted provided each respectively has a function similar to a pointing device.

The scanner 3612 optically reads an image and takes in the image data into the IP model generating apparatus. The scanner 3612 may have an optical character recognition (OCR) function as well. The printer 3613 prints image data and text data. The printer 3613 may be, for example, a laser printer or an ink jet printer.

Figure 37:
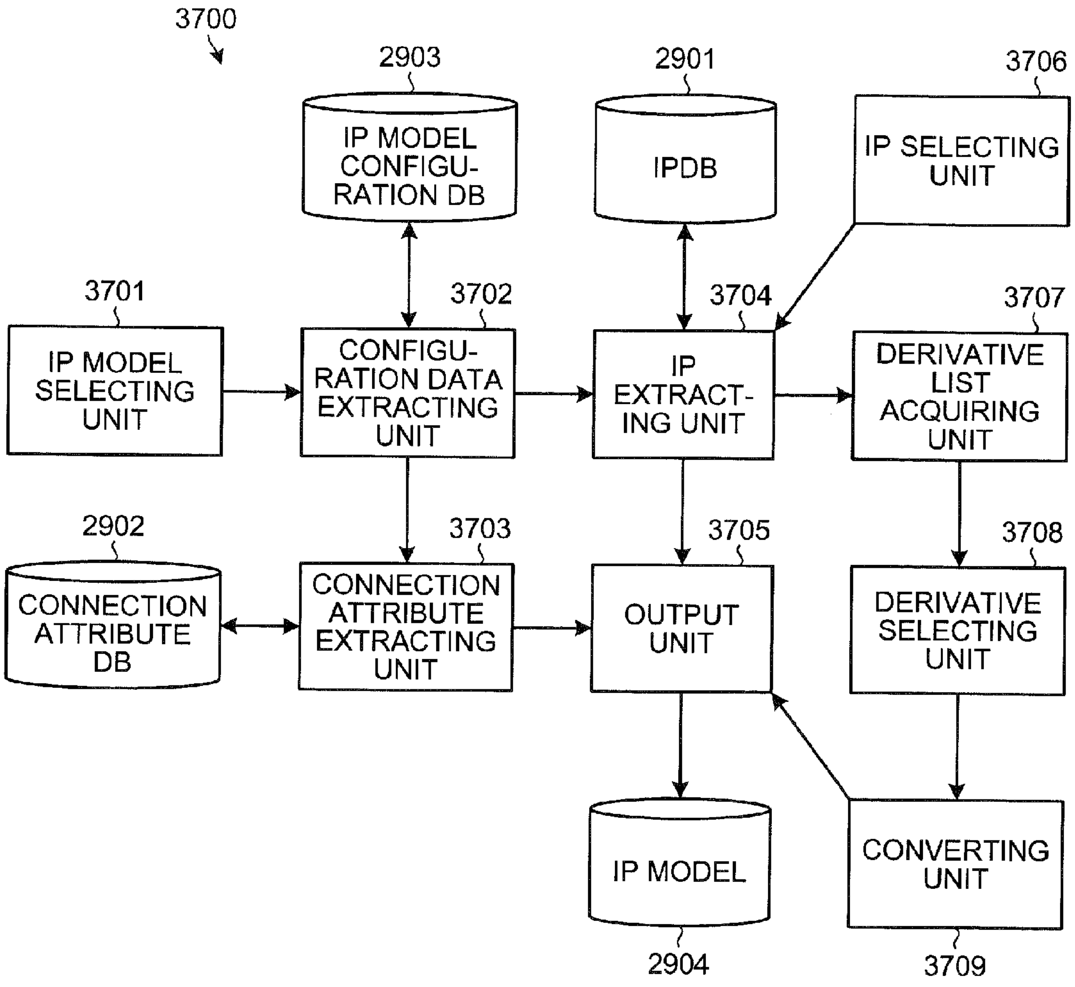
FIG. 37 is a block diagram of a functional configuration of the IP model generating apparatus.

FIG. 37 is a block diagram of a functional configuration of an IP model generating apparatus 3700. The IP model generating apparatus 3700 includes the IPDB 2901, the connection attribute DB 2902, the IP model configuration DB 2903, an IP model selecting unit 3701, a configuration data extracting unit 3702, a connection attribute extracting unit 3703, an IP extracting unit 3704, an output unit 3705, an IP selecting unit 3706, a derivative list acquiring unit 3707, a derivative selecting unit 3708, and a converting unit 3709.

A function of a control unit (the IP model selecting unit 3701 to the converting unit 3709) is implemented by causing the CPU 3601 to execute a program stored in the memory area of, for example, the ROM 3602, the RAM 3603, the magnetic disc 3605, the optical disc 3607, etc., depicted in FIG. 36 or by the I/F 3609. Respective functions of the IPDB 2901, the connection attribute DB 2902, and the IP model configuration DB 2903 are realize by the memory area of, for example, the ROM 3602, the RAM 3603, the magnetic disc 3605, the optical disk 3607, etc., depicted in FIG. 36.

The IP model selecting unit 3701 has a function of receiving a selection of the IP model to be utilized. For example, when memory contents of the IP model configuration DB 2903 are displayed on a display screen, the designer, using the mouse, etc., selects the configuration ID of the IP model configuration data desired for utilization.

The configuration data extracting unit 3702 has a function of extracting the configuration data of the IP model selected by the IP model selecting unit 3701 from the IP model configuration DB 2903. For example, triggered by the selection of the configuration ID, the configuration data extracting unit 3702 sends the selected configuration ID to the IP model configuration DB 2903 and reads out the IP model configuration data identified by the selected configuration ID.

The connection attribute extracting unit 3703 has a function of extracting, from the connection attribute DB 2902, the connection code defined by the IP model configuration data extracted by the configuration data extracting unit 3702. For example, the connection attribute extracting unit 3703 reads out the connection code linked to the arrow representing the connection (the connection code ID) in the extracted IP model configuration data from the connection attribute DB 2902.

The IP extracting unit 3704 has a function of extracting, from the IPDB 2901, the source code of the IP defined by the configuration data extracted by the configuration data extracting unit 3702. For example, the IP extracting unit 3704 reads out the source code of the IP linked to the IP-representing block (the ID of the IP) in the extracted IP model configuration data from the IPDB 2901.

The output unit 3705 has a function of outputting the connection code extracted by the connection attribute extracting unit 3703 and the source code of the IP extracted by the IP extracting unit 3704 as the IP model to be utilized. For example, the extracted IP source code and connection code are output as they are. Configuration may be such that insertion locations of the connection codes are defined by the IP model configuration data and the connection codes are put together to be output as a single file. The IP model is output in the form of display on the display 3608, printout by the printer 3613, transmission to the external computer, writing to the memory area, etc.

The IP selecting unit 3706 has a function of receiving a selection of the IP in the configuration data extracted by the configuration data extracting unit 3702. For example, when the IP model configuration data is displayed on the display 3608, the designer selects an IP, using the mouse 3611, etc.

The derivative list acquiring unit 3707 has a function of acquiring the derivative list of the selected IP, triggered by the selection of the IP via the IP selecting unit 3706. For example, when a given behavior "Behavior_A" is selected, the computer accesses the IPDB 2901, acquiring "Behavior_A2" as a behavior having the "Behavior_A" as its parent element, then acquires "Behavior_A3-1" and "Behavior_A3-2" as behaviors having the "Behavior_A2" as the parent element. By repeating this until no further behaviors are acquired, the derivative list may be acquired automatically.

The derivative selecting unit 3708 has a function of receiving a selection of the derivative of the IP selected via the IP selecting unit 3706. For example, when the derivative list is displayed on the display 3608, the designer selects a derivative from the derivative list, using the mouse 3611, etc.

The converting unit 3709 has a function of converting the IP selected via the IP selecting unit 3706 to the derivative selected via the derivative selecting unit 3708. For example, upon receiving the derivative, the converting unit 3709 converts the source code of the selected IP to the source code of the selected derivative. The source code after the conversion is output from the output unit 3705.

Figure 38:
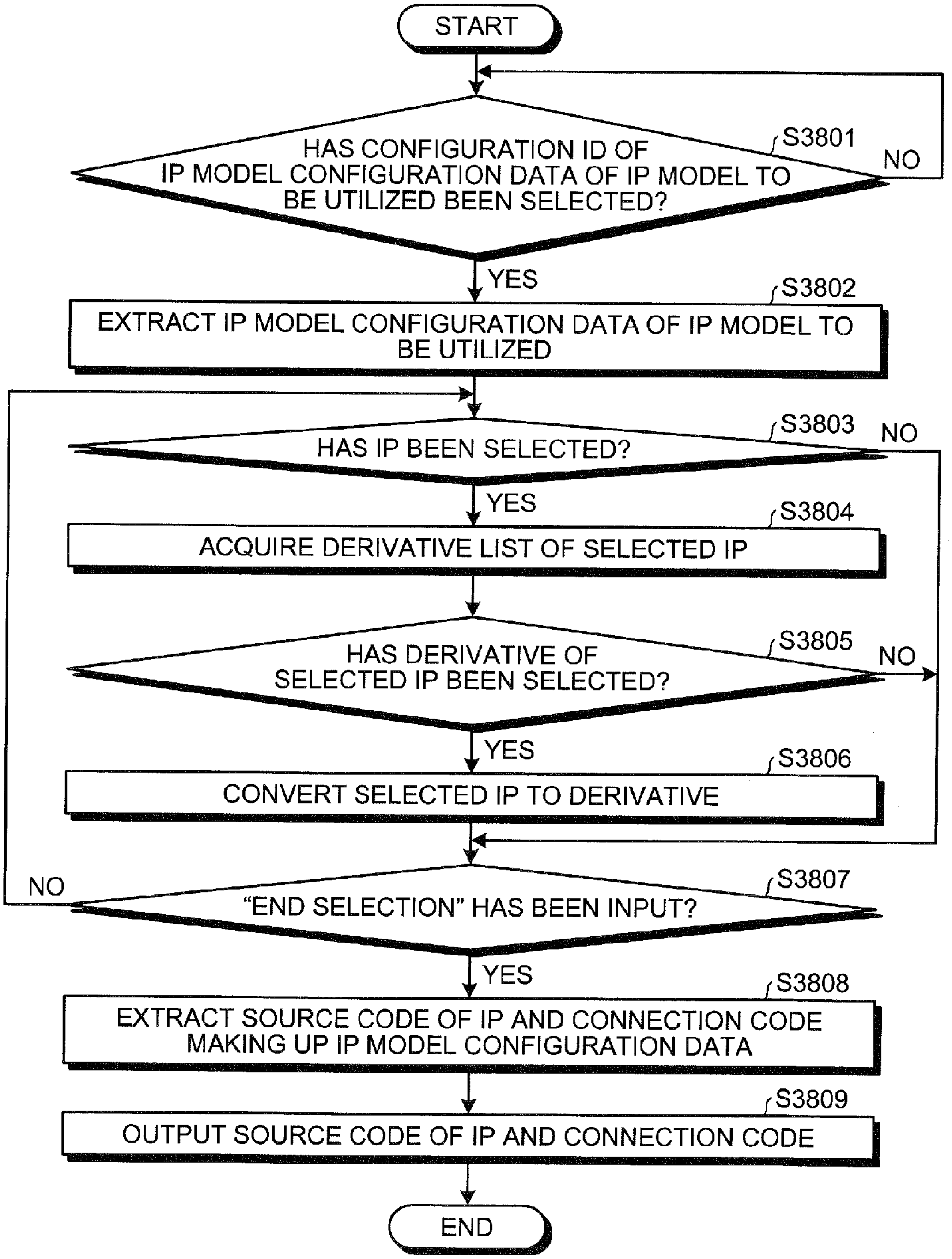
FIG. 38 is a flowchart of IP model generation by the IP model generating apparatus.

FIG. 38 is a flowchart of the IP model generation by the IP model generating apparatus 3700. The flowchart depicts the procedure of automatic execution by the IP model generating apparatus 3700. Firstly, the configuration ID of the IP model configuration data of the IP model to be utilized 3701 is selected (step S3801: NO).

When the configuration ID has been selected (step S3801: YES), the configuration data extracting unit 3702, using the configuration ID, extracts from the IP model configuration DB 2903, the IP model configuration data of the IP model to be utilized (step S3802).

Judgment is made of whether the IP (block) of the extracted IP model configuration data has been selected (step S3803). If the IP has not been selected (step S3803: NO), the flow proceeds to step S3807. If the IP has been selected (step S3803: YES), the derivative list acquiring unit 3703 acquires the derivative list for the selected IP (step S3804). If the derivative list has already been acquired, the flow proceeds to step S3805.

If the derivative of the selected IP has not been selected (step S3805: NO), the flow proceeds to step S53807. On the other hand, if the derivative of the selected IP has selected been (step S3805: YES), the selected IP in the IP model configuration data is converted to the derivative (step S3806).

Subsequently, the flow proceeds to the step S3807. At step S3807, judgment is made of whether "END SELECTION" has been input (step S3807). If "END SELECTION" has not been input (step S3808: NO), the flow returns to step S3803. On the other hand, if "END SELECTION" has been input (step S3808: YES), the IP extracting unit 3704 extracts the source code of the IP (including the derivative) making up the IP model configuration data extracted at step S3802 (if converted to the derivative, the IP model configuration data after the conversion) and the connection code (step S3808).

Subsequently, the output unit 3705 outputs the extracted source code and connection code (step S3809), thereby finishing the IP model generation processing. A wrapper may be generated for connection to the external interface, as required.

As described, according to the present embodiments, modification may be localized to simple description of the connection attribute by simply classifying the components of the IP model into no more than four classes of the interface, the register, the behavior, and the state. The IP model may be expressed by a combination of the connection attributes.

Therefore, improvement of the reusability of the connection attributes between the IPs making up the IP model is achieved. By dividing each processing and localizing places of modification, the reusability is improved. This localizing makes it possible to narrow down the range of verification of derivative types. Therefore, the template need not assimilate all of the types and there is no occurrence of the template code explosively increasing according to type. Therefore, since the readability of the source code is not impaired and bugs do not propagate, improved quality of the IP model may be achieved.

In particular, the model structure is independent of the time concept and, the interface and the state are made selectable as required depending on the time concept and the accuracy. This enables the separately developed models to be made common, reducing the man-hours for model development and the management.

The model structure is independent of the tool and the interface is selectable (replaceable) according to the tool to be used. This enables the model core parts separately developed by the tool to be made common, reducing the man-hours for model development and the management. Since only updating of the interface is required at the time of incorporating the model into a new tool, the man-hours for development may be reduced.

The model structure is independent of the target and, the number of the interfaces, the correlation of the register and the behavior, etc., are freely configurable according to the object to be developed, thereby enabling the man-hours for development of similar types or derivative types to be reduced by the use of the library 600.

The IP model generating method explained in the present embodiments may be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium storing therein an Intellectual Property (IP) model generating program that causes a computer to execute:

receiving selection of an IP model;

extracting configuration data of the selected IP model from an IP model configuration database;

extracting, based on an ID identifying an IP defined by the extracted configuration data, a source code of the IP from an IP database in which IDs of IPs and source code of the IPs are stored and correlated with each other;

extracting, based on a connection code ID identifying a connection code defined by the extracted configuration data, a connection code from a connection attribute database in which connection code IDs and connection codes indicating connecting relations among the IPs are stored and correlated with each other; and outputting, as the IP model, the extracted source code of the IP and the extracted connection code, wherein the computer is capable of accessing the IP database; the connection attribute database; the IP model configuration database storing the configuration data indicating a configuration of the IP model defined by the IPs and the connecting relations; an IP table storing attributes of the IPs correlated with the IDs of the IPs; and a connection code table storing connection attributes of the connection codes correlated with the connection code IDs, the IP model is an abstraction model utilized in a high-level design of a hardware and is obtained by modeling the hardware, each of the IPs is a configuration component of the IP model and represents one of functions of the hardware, and the IPs include:

an interface representing a function of inputting or outputting data;

a register representing a function of storing the data;

a behavior representing a function of executing processing based on the data; and a state representing a function of performing wait processing in accordance with time information from the interface.

2. The recording medium according to claim 1, wherein the IP model generating program further causes the computer to execute:

receiving selection of an IP in the extracted configuration data;

receiving selection of a derivative of the selected IP;

converting the selected IP into the selected derivative; and extracting source code of the derivative from the IP database.

3. The recording medium according to claim 1, wherein the interface and the state are replaceable according to presence of time concept.

4. The recording medium according to claim 1, wherein the state is of description to perform the wait processing by acquiring the time information from the interface, if the interface and the state are of description having the time concept.

5. The recording medium according to claim 1, wherein the state is of description not to perform the wait processing, if the interface and the state are of description not having the time concept.

6. The recording medium according to claim 1, wherein the IPs are prepared for each tool, and the IP model comprises the IPs of a single tool.

7. The recording medium according to claim 1, wherein an IP of a given type is replaceable with a derivative of the given type.

8. An Intellectual Property (IP) model generating apparatus comprising:

a computer that executes a process including:

receiving selection of an IP model;

extracting configuration data of the selected IP model from an IP model configuration database;

extracting, based on an ID identifying an IP defined by the extracted configuration data, a source code of the IP from an IP database in which IDs of IPs and source code of the IPs are stored and correlated with each other;

extracting, based on a connection code ID identifying a connection code defined by the extracted configuration data, a connection code from a connection attribute database in which connection code IDs and connection codes indicating connecting relations among the IPs are stored and correlated with each other; and outputting, as the IP model, the extracted source code of the IP and the extracted connection code, wherein the computer is capable of accessing the IP database; the connection attribute database; the IP model configuration database storing the configuration data indicating a configuration of the IP model defined by the IPs and the connecting relations; an IP table storing attributes of the IPs correlated with the IDs of the IPs; and a connection code table storing connection attributes of the connection codes correlated with the connection code IDs, the IP model is an abstraction model utilized in a high-level design of a hardware and is obtained by modeling the hardware, each of the IPs is a configuration component of the IP model and represents one of functions of the hardware, and the IPs include:

an interface representing a function of inputting or outputting data;

a register representing a function of storing the data;

a behavior representing a function of executing processing based on the data; and a state representing a function of performing wait processing in accordance with time information from the interface.

9. An Intellectual Property (IP) model generating method that causes a computer to execute:

receiving selection of an IP model;

extracting configuration data of the selected IP model from an IP model configuration database;

extracting, based on an ID identifying an IP defined by the extracted configuration data, a source code of the IP from an IP database in which IDs of IPs and source code of the IPs are stored and correlated with each other;

extracting, based on a connection code ID identifying a connection code defined by the extracted configuration data, a connection code from a connection attribute database in which connection code IDs and connection codes indicating connecting relations among the IPs are stored and correlated with each other; and outputting, as the IP model, the extracted source code of the IP and the extracted connection code, wherein the computer is capable of accessing the IP database; the connection attribute database; the IP model configuration database storing the configuration data indicating a configuration of the IP model defined by the IPs and the connecting relations; an IP table storing attributes of the IPs correlated with the IDs of the IPs; and a connection code table storing connection attributes of the connection codes correlated with the connection code IDs, the IP model is an abstraction model utilized in a high-level design of a hardware and is obtained by modeling the hardware, each of the IPs is a configuration component of the IP model and represents one of functions of the hardware, and the IPs include:

an interface representing a function of inputting or outputting data;

a register representing a function of storing the data;

a behavior representing a function of executing processing based on the data; and a state representing a function of performing wait processing in accordance with time information from the interface.

* * * * *